United States Patent [19]

Nakajima

[11] Patent Number: 5,481,354
[45] Date of Patent: Jan. 2, 1996

[54] IMAGE FORMING APPARATUS

[75] Inventor: Akio Nakajima, Toyokawa, Japan

[73] Assignee: Minolta Co., Ltd., Osaka, Japan

[21] Appl. No.: 358,511

[22] Filed: Dec. 19, 1994

[30] Foreign Application Priority Data

Mar. 4, 1994 [JP] Japan .................................. 6-035036

[51] Int. Cl.$^6$ .................................................. G03G 21/00
[52] U.S. Cl. .......................... 355/324; 355/208; 355/319; 355/321
[58] Field of Search ............................. 355/24, 208, 210, 355/233, 308, 309, 313, 318, 320, 321, 324, 319; 358/449, 474, 488, 494, 497

[56] References Cited

U.S. PATENT DOCUMENTS

| | | | |
|---|---|---|---|
| 4,501,490 | 2/1985 | Miyamoto et al. | 355/324 X |
| 4,763,167 | 8/1988 | Watanabe et al. | 355/324 X |
| 4,811,048 | 3/1989 | Ishikawa et al. | 355/324 X |
| 4,922,350 | 5/1990 | Rombola et al. | 358/488 |
| 4,937,612 | 6/1990 | Shogren | 355/24 |
| 4,965,629 | 10/1990 | Hiroi et al. | 355/324 X |
| 5,151,797 | 9/1992 | Nosaki et al. | 358/474 |
| 5,229,812 | 7/1993 | Toyama et al. | 355/324 X |
| 5,392,109 | 2/1995 | Acquaviva | 355/320 |

FOREIGN PATENT DOCUMENTS 1-220970  9/1989  Japan .
3-233578  10/1991  Japan .
5-278365  10/1993  Japan .

*Primary Examiner*—Sandra L. Brase
*Attorney, Agent, or Firm*—Willian Brinks Hofer Gilson & Lione

[57] ABSTRACT

In an image forming apparatus having two-face copy mode, an image reader can read a document image placed on a platen along a subscan scan direction and along a direction reverse to the subscan direction. The image reader includes an image sensor for reading a document image along a main scan direction and along a direction reverse to the main scan direction. In the normal image mode and in the reverse image mode, a normal image and a reverse image of a document are formed by controlling the reading direction and the subscan direction. When a stapler is used to staple a plurality of copy papers, but at positions in the papers which are not appropriate to turn over them if normal images are formed on the papers, the reverse image mode is set for forming a normal image of the document. Further, when a back face is printed in two-face copy mode, it is decided if the back face is placed on the platen so that the image in the back face is reproduced as a reversed image to the image in the front page according to document direction (portrait document or a landscape document), a position of margin, and a direction of the document with respect to document feed direction. The scan mode is changed when it is decided that the document is placed on the platen so that the image in the back face is reproduced as a reversed image to the image in the front page.

10 Claims, 22 Drawing Sheets

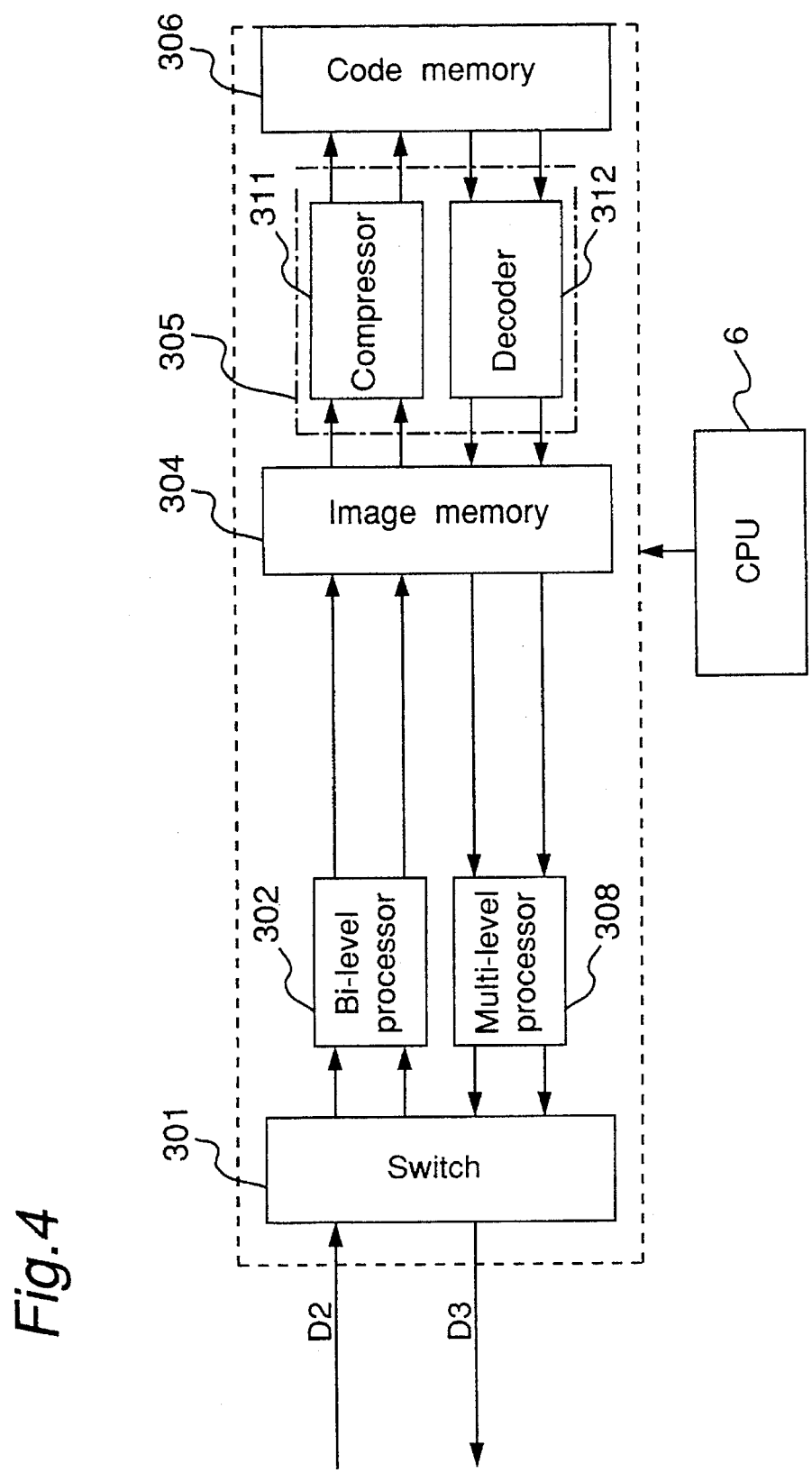

Portrait
Left margin

Portrait
Top margin

Landscape
Left margin

Landscape
Top margin

Fig. 9A
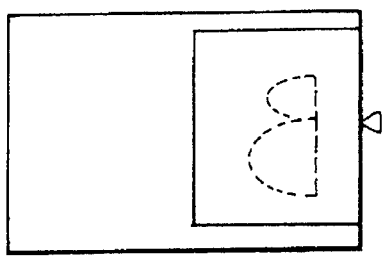 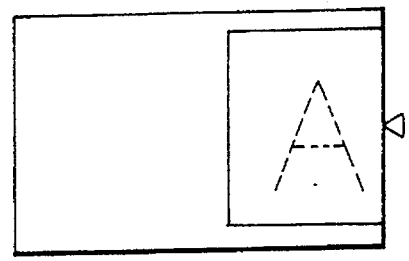
Fig. 9B
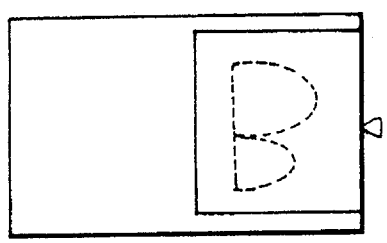 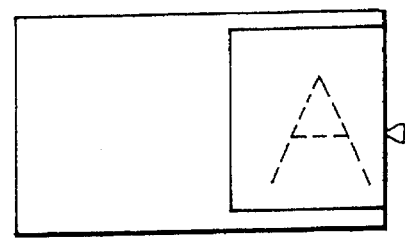
Fig. 9C
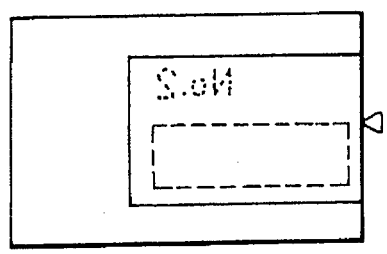 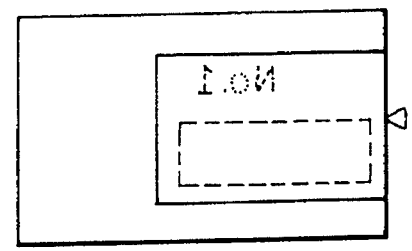
Fig. 9D
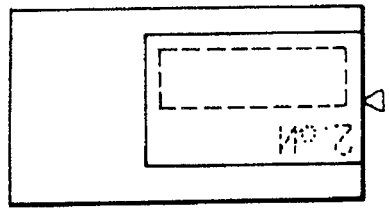 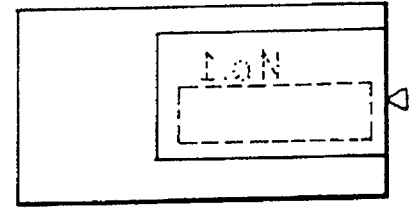

Fig. 9E
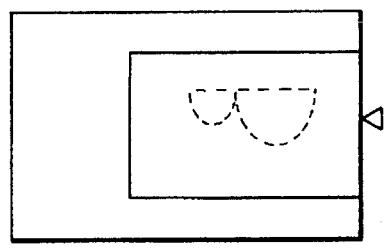 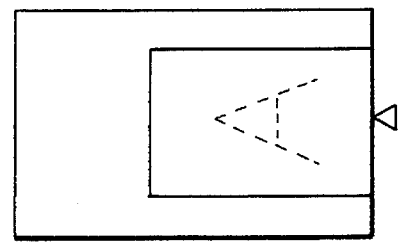
Fig. 9F
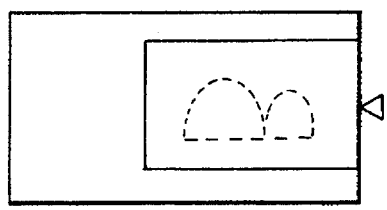 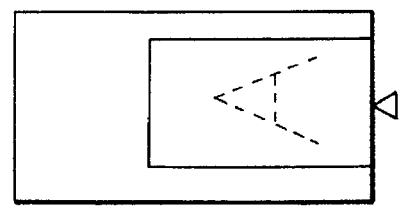
Fig. 9G
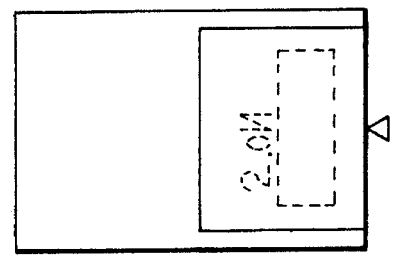 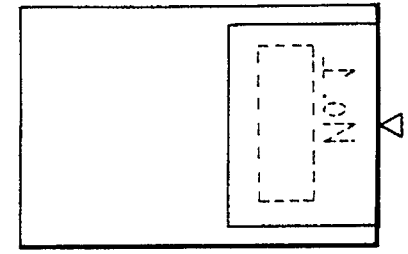
Fig. 9H
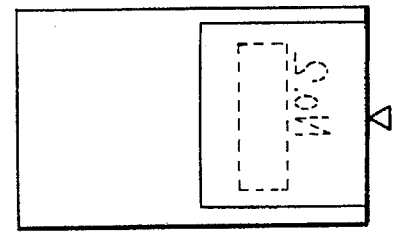 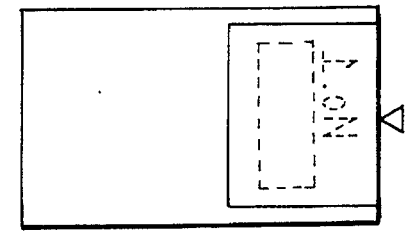

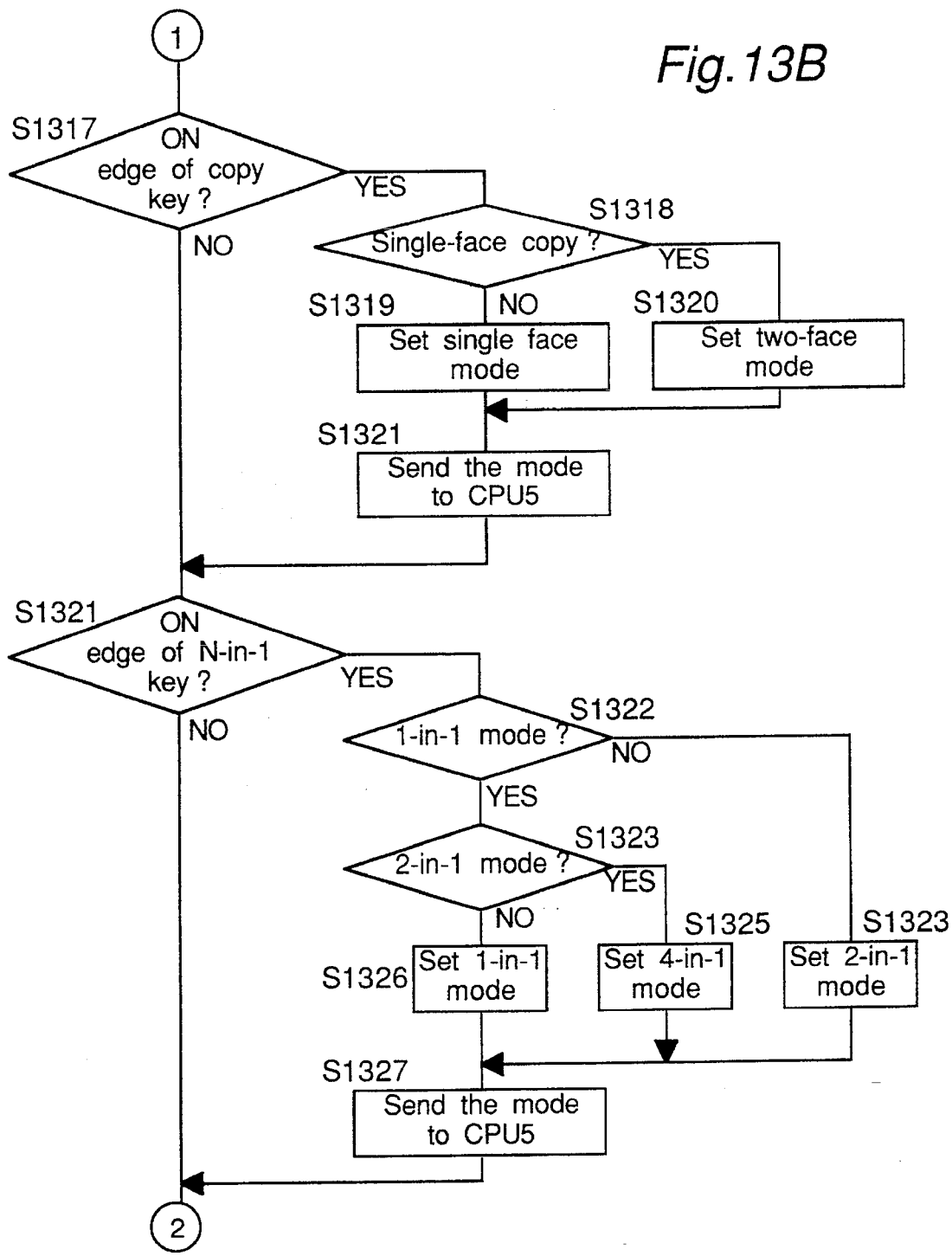

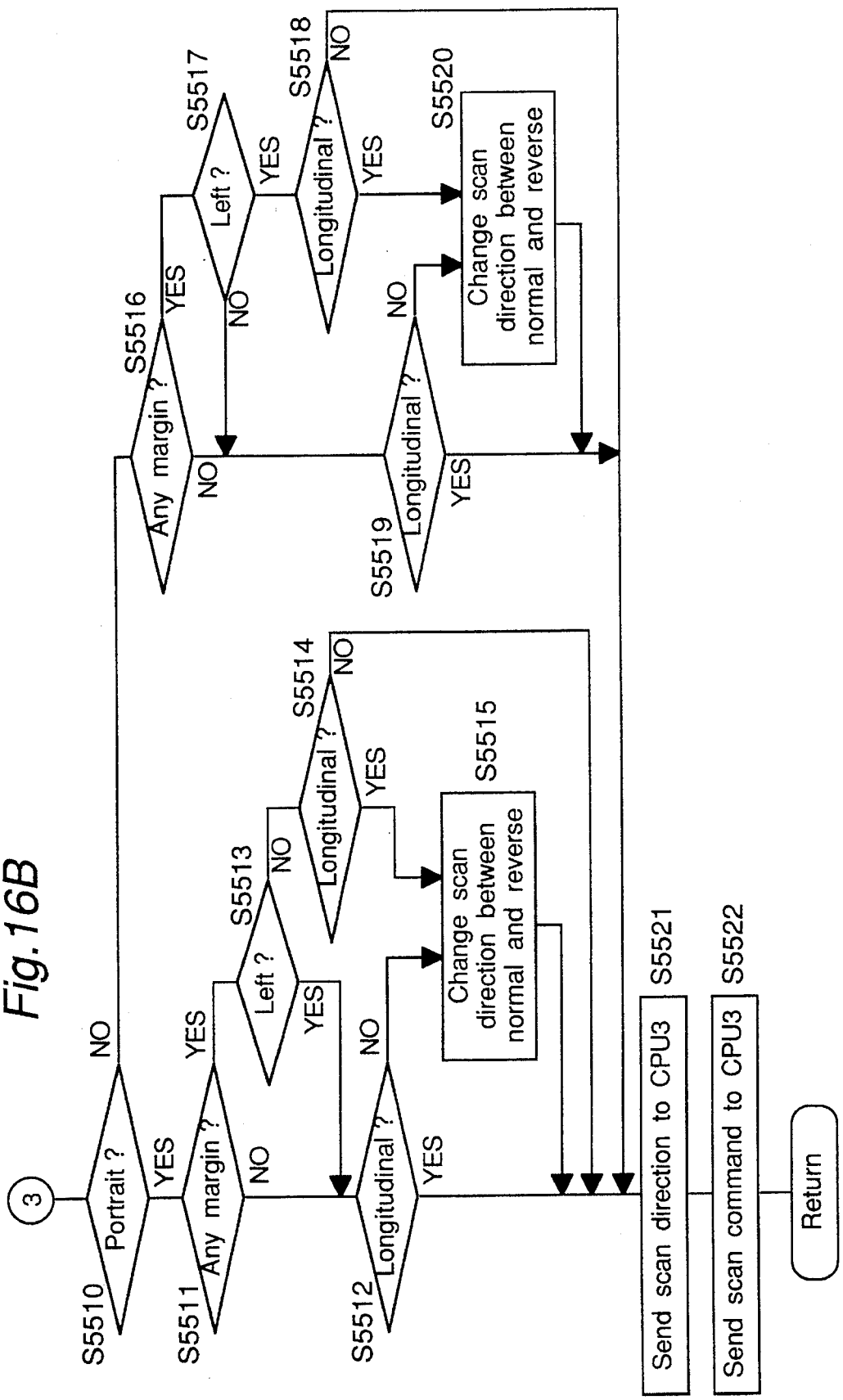

IMAGE FORMING APPARATUS

BACKGROUND OF THE INVENTION

1. Field of the Invention

The present invention relates to an image forming apparatus such as a digital copying machine which forms an output image by using digital image data.

2. Description of the Prior Art

An image reader is known to use a scanner moving along a subscan direction to read an image of a document placed on a platen. For example, in an image reader disclosed in U.S. Pat. No. 4,992,350, a document size is detected when a scanner moves along a forward direction and image data is read when the scanner moves along a return direction. Therefore, no prescan for detecting a document size is needed, and if such an image reader is used with a digital copying machine, productivity of copy papers can be improved. It is to be noted that this apparatus reads a document only along one direction. Therefore, discharged copy papers are also put in order along one direction.

A stapler may be attached to a digital copying machine to staple discharged copy papers on which images have been formed. However, the staple position of the stapler on the discharged copy papers is not necessarily located at a position suitable for stapling them. Further, the direction of document images are not necessarily the same. For example, when two-face documents are reproduced, the directions of document images of front and back pages having top margins are reversed to each other. In such a case, the direction of document images are changed alternately. If copy papers including normal and reverse directions of output images are produced, a user has to sort or rearrange them. On the other hand, a digital copying machine is also known to have 2-in-1 mode or 4-in-1 mode where two or four documents are reproduced on a single face of a paper side by side. Then, it is needed that two document or four images on the same face have same document directions even if they are read from a two-face document.

SUMMARY OF THE INVENTION

An object of the present invention is to provide a an image forming apparatus wherein document images can always be bound with staples at suitable positions with a stapler.

Another object of the present invention is to provide an image forming apparatus wherein document images can always be reproduced with suitable directions thereof.

In one aspect of the invention of an image forming apparatus, an image sensor detects an image of a line in a document along a first direction or along a second direction reverse to the first direction, while a scan system which can shift a line detected by said image sensor along a third direction perpendicular to the first direction when the image sensor detects the line of the document along the first direction or along a fourth direction reverse to the third direction. An image read by the image sensor is reproduced on a paper. A stapler for stapling a plurality of papers stacks the papers so as to have an appropriate staple position when images of documents are detected along the first direction. A user can select staple mode using the stapler or non-staple mode not using the stapler. A control means controls the image sensor to read a document image along the first line and the scan system to move along the third direction when the staple mode selection means selects the staple mode. Then, the papers can be stapled at a suitable position.

In a second aspect of the invention, it is decided if the staple position of said stapler is appropriate in a reproduced image of a document or not. When it is decided that the staple position of the stapler is not appropriate for an image of a document to be reproduced, the detection direction by the image sensor and the shift direction by the scan system are reversed. Preferably, the document status is decided according to the document direction of a portrait document or a landscape document, the position of margin, and the longitudinal direction of the document with respect to document feed direction of a document feeder.

An advantage of the present invention of an image forming apparatus is that a stapler can always staple a plurality of papers at an appropriate position.

An advantage of the present invention of an image forming apparatus is that a stapler can always staple a plurality of papers at an appropriate position by controlling the scan of document according to a status of document placed on a platen on a direction of a reproduced image of the document.

BRIEF DESCRIPTION OF THE DRAWINGS

These and other objects and features of the present invention will become clear from the following description taken in conjunction with the preferred embodiments thereof with reference to the accompanying drawings, and in which:

FIG. 4 is a block diagram of a memory unit;

FIGS. 9A–9H are plan views of front and back faces of a two-face document of various kinds of two-face documents;

FIGS. 13A, 13B and 13C are a flowchart of key-input control;

FIGS. 16A and 16B show a flow of command setting in FIG. 15;

DETAILED DESCRIPTION OF THE PREFERRED EMBODIMENTS

Figure 1:
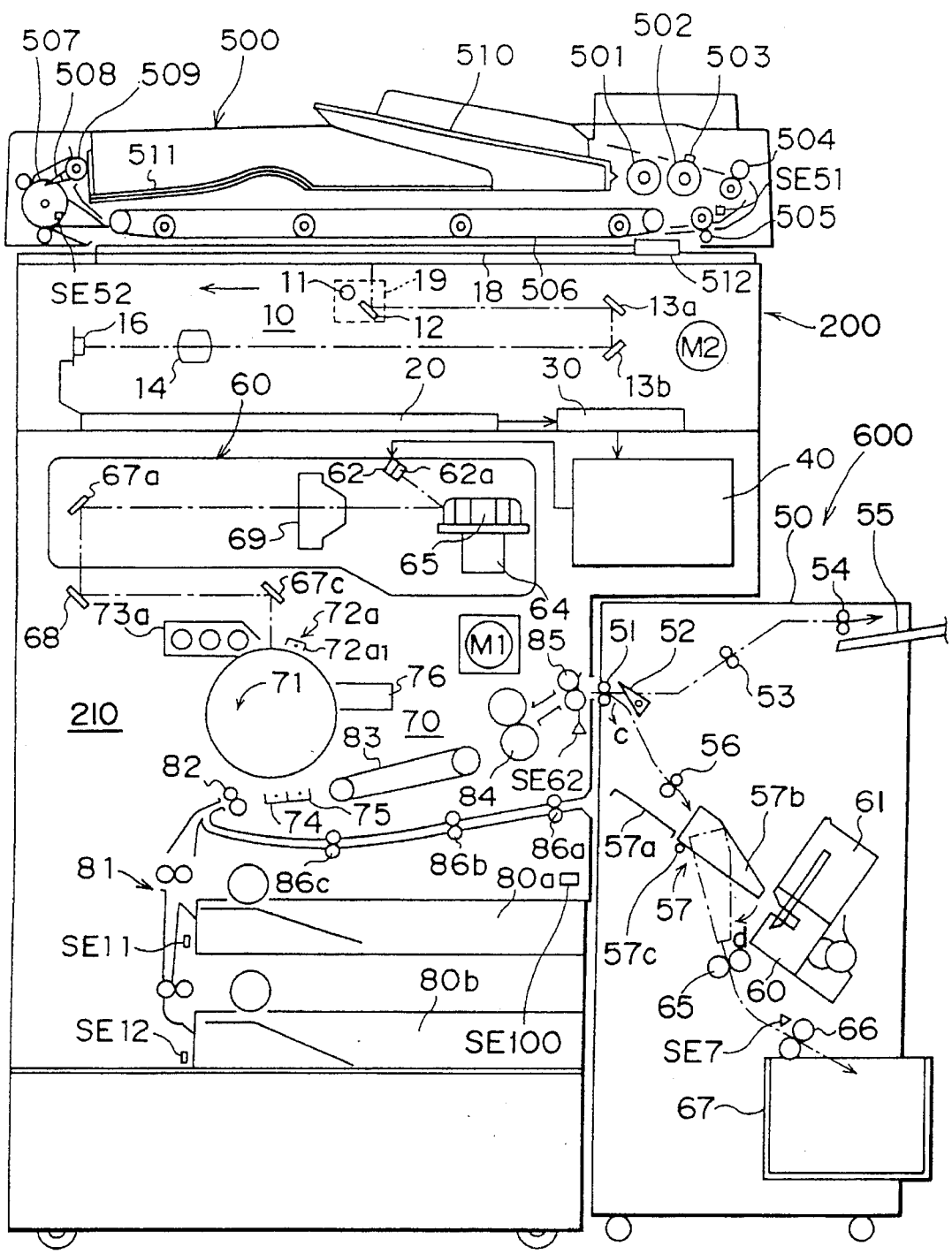
FIG. 1 is a sectional view of a copying machine of an embodiment of the invention.

Referring now to the drawings, wherein like reference characters designate like or corresponding parts throughout the several views, embodiments of the present invention are explained.

(1) Structure of digital copying machine

FIG. 1 shows a digital copying machine which comprises an image reader 200 and a printer 210, with an automatic document feeder 500 and a finisher unit 600. The image reader 200 comprises a scan system 10 which reads a document to convert optical signals thereof to image signals and an image signal processor 20 for processing the image signals received from the scan system 10. A exposure lamp 11 and a first mirror 12 are fixed to a first slider 19 which moves below a platen 18. Mirrors 13a and 13b are also fixed to a second slider (not shown) which also moves below the platen 18. A scan motor M2 drives the sliders. A light illuminated by the exposure lamp 11 is reflected from the document and reflected further by the mirrors 12, 13a and 13b. Then, the reflected light is transmitted through a lens 14 to be focused on a photoelectric converter 16 having linear CCD sensors or the like. The converter 16 converts an image to electric signals. The image signal processor 20 processes the image signals received from the photoelectric converter 16 and send image data to a memory unit 30 which will be explained later.

The printer 210 comprises a print processor 40 for driving a laser diode 62 according to the image data, an optical system 60 for exposing a photoconductor drum 71 with a laser beam of the laser diode 62 and an image forming system 70 for developing a latent image formed on the photoconductor drum 71 and forming the image on a paper. The print processor 40 provides signals to the laser diode 62 in the optical system 60. The laser diode 62 modulates a beam according to the signals, and the beam is reflected by a polygon mirror 65, passes a lens 66 and reflected further by mirrors 67a, 68 and 67c to expose the photoconductor drum 71. Thus, a latent image is formed on a photoconductor drum 71 in the image forming system.

In the image forming system 70, a sensitizing charger 72a, a development unit 73a, a transfer charger 74, a separation charger 75 and a cleaning unit 76 are arranged around the photoconductor drum 71. The development unit 73 includes a two-component development material of toners and carriers. The latent image on the photoconductor drum 71 is developed by the development unit 73. On the other hand, papers are installed in cassettes 80a and 80b, and one of them is carried through a guide 81 to a timing roller 82. A size of a carried paper is detected by a sensor SE11 or SE12. Then, it is carried by timing rollers 82 at an appropriate timing toward the photoconductor drum 71 and the toner image is transferred by the transfer charger 74 on the paper and is separated by the separation charger 75 from the photoconductor drum 71. It is carried further by a conveying belt 83 to fixing rollers 84 which fixed the toner image on the paper. Then, the fixed paper is discharged by rollers 85 through the finisher unit 600 onto a discharge tray 55. The discharge is detected by a sensor SE62.

The document feeder 500 feed documents put on a document tray 510 onto the platen 18 one by one and discharge the document after it is read by the image reader 200. In a single face document mode, documents are stacked on the tray 510 with faces up. The documents are carried one by one from a document located at the bottom among the documents by rollers 501, 502 and 504 and a timing roller 505 and is located on the platen 18 precisely. A length of the document is detected by sensors SE51. Then, the document on the platen 18 is read by the image reader 200. After the document is read, it is carried by a conveyer belt 506 towards left, inverted by a roller 507, guided by a claw 508 and discharged by a roller 509 onto a tray 511 with its face up.

In a two-face document mode, an image on a front face of a document located on the platen 18 is read as explained above in the single-face mode. The claw 508 is moved upward while the image on a front face is read. After the front face of the document is read, it is carried by the roller 507 and guided below the claw 508 towards the platen 18 reversely. The scanner 19 moves left and stops at an appropriate position for reading the back face in correspondence to the length of the document. This position is a little right from a position where the top of the document after the inversion and the bottom thereof before it agree with each other. If the length a document is too short, the left side of the platen 18 is set as the position. The document length has been detected by the sensors SE51 while the document is fed. Then, the document is carried by the conveyer belt 506 left at a constant speed in correspondence to the magnification power while the back face of the document is read at the above-mentioned position by the image reader 200. The claw 508 is moved downward. After the back face is read, a moving direction of the conveyer belt 506 is reversed again, and the document is carried and discharged by the rollers 507 and 509 onto the tray 511 with its front face up.

Next, the finisher unit 600 is explained. It is provided for carrying and stapling copy papers. A sensor . SE100 is provided to detect that the finisher unit 600 is attached to the copying machine. In non-staple mode, a claw 52 is set at a low position rotated along a direction denoted as "c". Then, a sheet of paper carried by the rollers 85 is carried by rollers 51 and guided over the claw 52. The sheet is carried further by rollers 53 and discharged by rollers 54 onto the tray 55 which can be moved up and down stepwise according to the sheets of paper to be loaded. The tray 55 can also be moved horizontally, and it is moved for sorting copy sheets after copy operation bf a cycle is completed.

In staple mode, the claw 52 is moved upward, and papers are carried by rollers 51 and guided below the claw 52. They are carried further by rollers 56 and received onto a tray 57. A stapler 60 has a known mechanism which binds a bundle of sheets with a staple at a prescribed position. A punch 61 for two or three punctures is installed in the finisher unit 50.

The tray 57 consists of a base plate 57a and a regulation plate 57b. The regulation plate 57b is moved around an axis 57c between two positions illustrated with a solid lind and with a dash and dot line, and usually it is set at the position illustrated with the solid line to receive, regulate and staple and/or punch papers. Then, the plate 57b is moved to the position illustrated with the dash and dot line, and the papers received in the plate 57b slide due to their weight and are taken out by rollers 65 and 66 onto a stacker 67. A sensor SE7 located above the rollers 66 detects the discharged papers.

Figure 2:
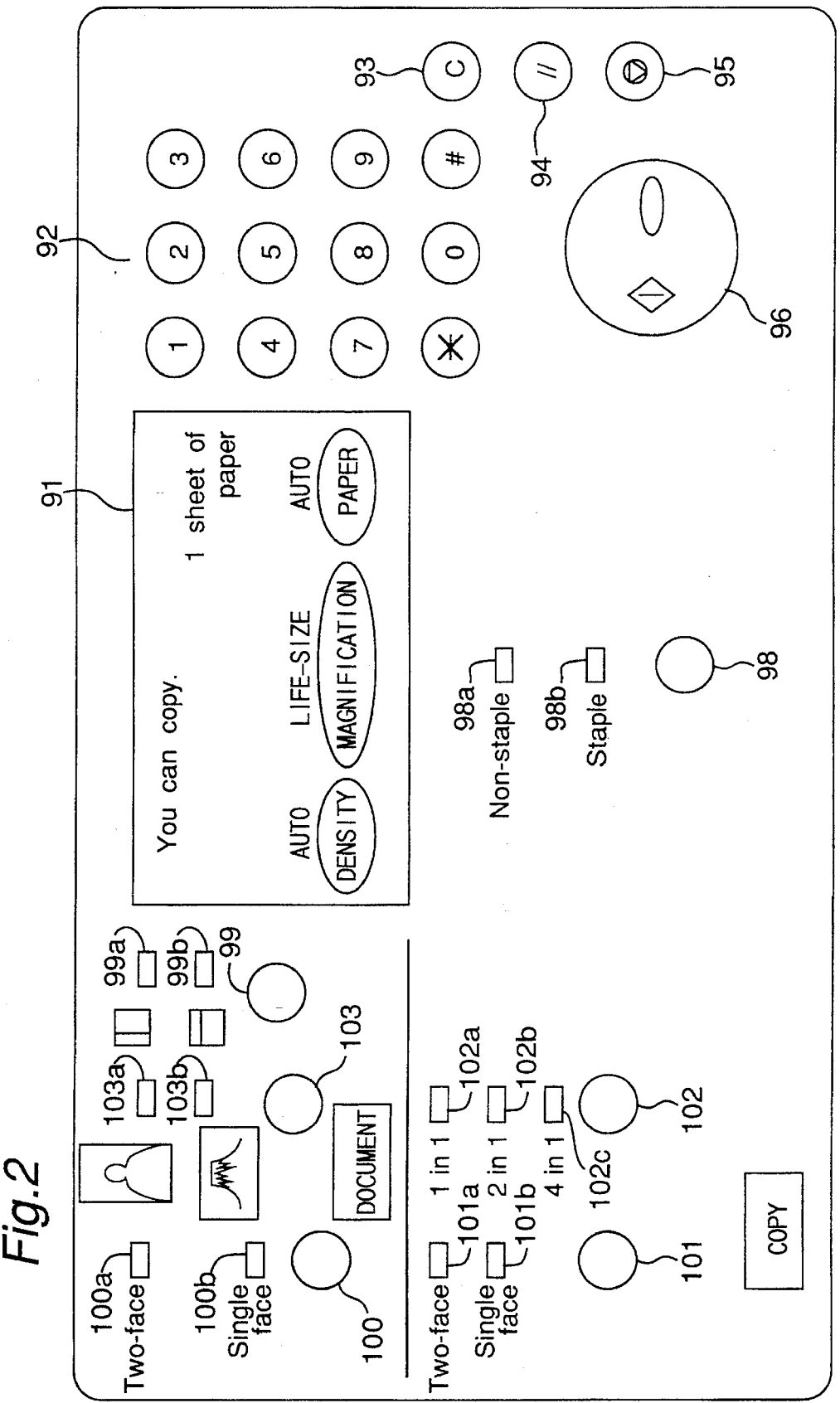
FIG. 2 is a plan view of an operational panel.

FIG. 2 shows an operational panel 90 of the digital copying machine, and it has a liquid crystal touch panel 91, various keys 92–103 and light emitting diode (LED) displays 97a, 97b, 98a, 98b, 99a, 99b, 100a, 100b, 101a, 101b, 102a, 102b, 102c, 103a and 103b. Ten-keys 92 are used to setting a number of papers to be copied for a document or a magnification power for copy. A clear key 93 is used to set the number as "1" or the like. A reset key 94 is used to return to standard conditions. A stop key 95 is used to stop copy operation. A start key 96 is used to start copy operation. A finish key 98 is used to select staple mode or non-staple mode, and the LED displays 98a and 98b are turned on when the staple mode and the non-staple mode are selected, respectively. A margin key 99 is used to select a position of a margin at left side or at top side, and the LED displays 99a and 99b are turned on when the left margin and the top margin are selected, respectively. A key 100 is used to specify if a document is a single-face document or a double-face document, and the LED displays 100a and 100b are turned on when the single-face document mode and the two-face document mode are selected, respectively. A copy mode key 101 is used to select two-face copy mode or single-face copy mode, and the LED displays 101a and 101b are turned on when the single-face copy mode and the two-face copy mode are selected, respectively. An N-in-1 key 102 is used select 1-in-1 mode (normal copy mode), 2-in-1 mode or 4-in-1 mode, and the LED displays 102a, 102b and 102c are turned on when 1-in-1 mode (normal copy mode), 2-in-1 mode or 4-in-1 mode are selected, respectively. A document direction key 103 is used to select document direction of portrait or landscape, and the LED displays 103a and 103b are turned on when portrait and landscape are selected, respectively.

The touch panel 91 displays various statuses such as jam, serviceman call, paper empty and the like, various modes on exposure level, magnification power, paper size and the like and receives touch-inputs therefor.

Figure 3A:
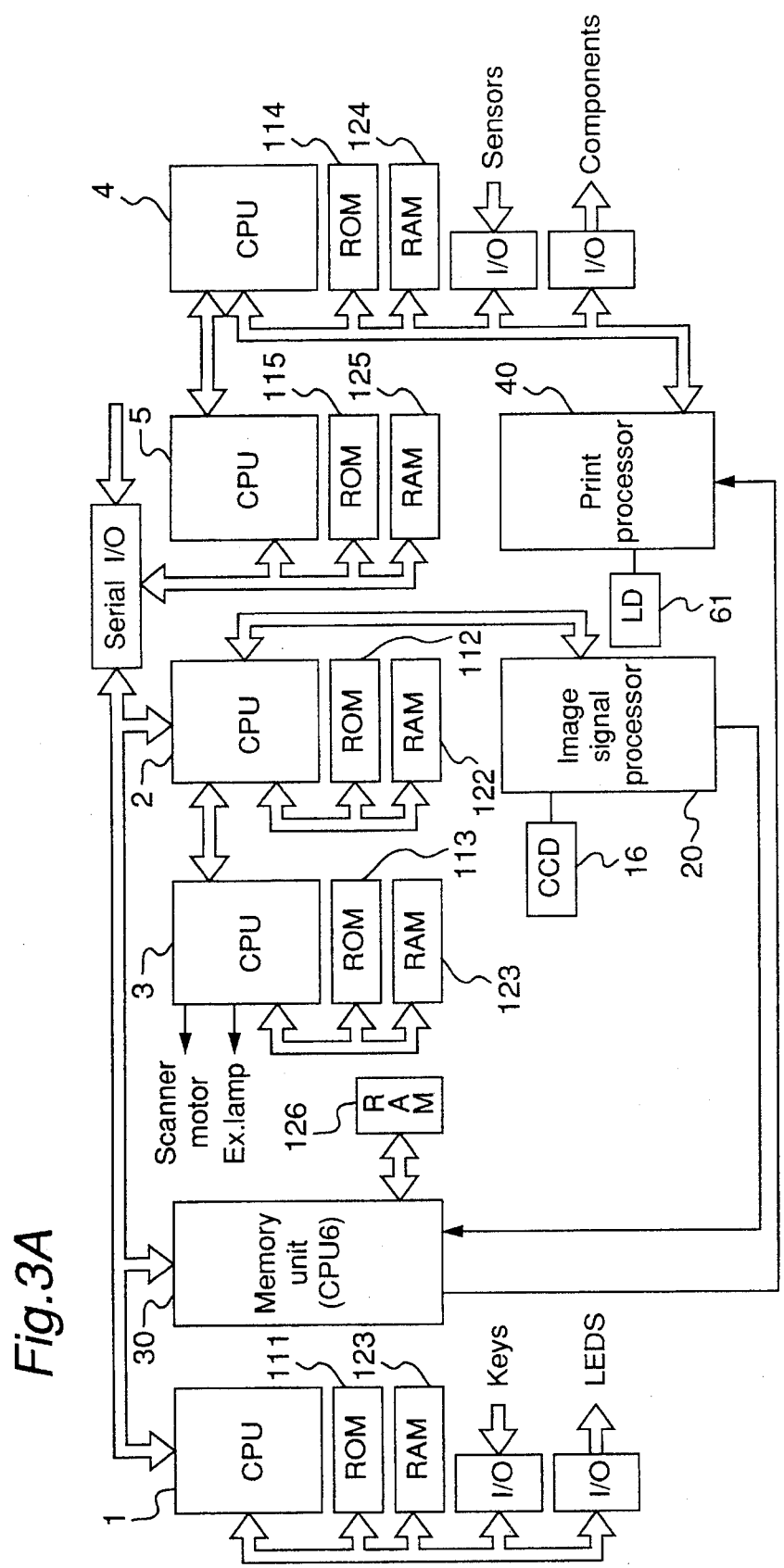
FIGS. 3A and 3B are a block diagram of a control section of the copying machine.
Figure 3B:
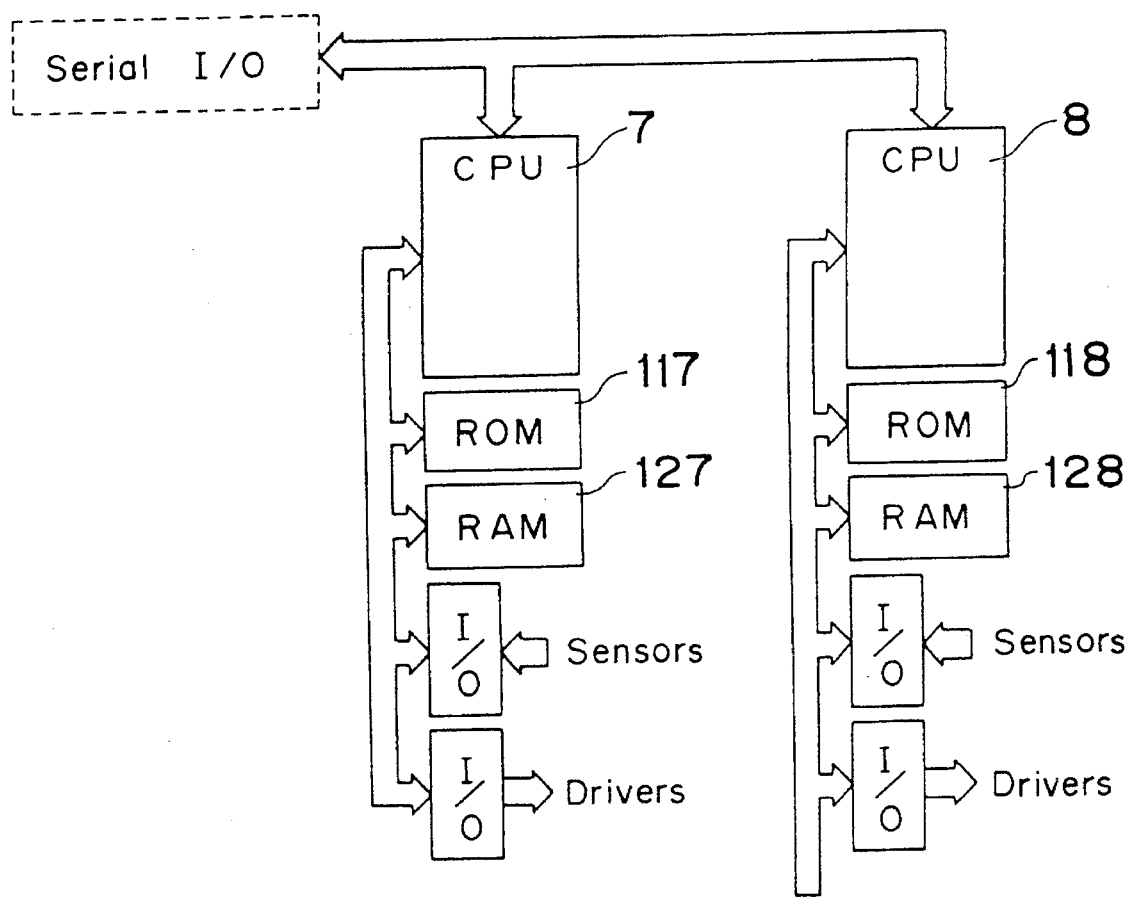

FIGS. 3A and 3B show a block diagram of a control section 100 of the copying machine 1. The controller 100 consists of eight central processing units (CPUs) 1–8, each of which is connected to a read only memory (ROM) 111–118 storing programs and a random access memory (RAM) 121–128 used as a work area. The CPU 6 is provided in a memory unit 30.

The CPU 1 controls key-input signals from the operational panel 90 and displays therein. The CPU 2 controls the image signal processor 20. The CPU 3 controls the scan system 10. The CPU 4 controls the print processor 40, the optical system 60 and the image forming system 70. Especially, the CPU 4 manages the size of a copy paper according to signals from the sensors SE11 and SE 12. The CPU 5 processes timing control and mode setting of the entire controller 100. The CPU 6 controls the memory unit 30 to store image data in an image memory 304 and to send them to the print system 40. The CPU 7 controls the document feeder 500. The CPU 8 controls the finisher unit 600. The CPUs 1–8 communicate commands, reports, data and the like with each other by using interrupts.

In the image signal processor 20 controlled by the CPU 2, an image signal received from the photoelectric converter 16 is converted by an A/D converter to an 8-bit image data for each pixel and the data is corrected for shading correction. Then, the data is processed according to a magnification power. Then, the image data is corrected for smoothing, edge emphasis and the like. Finally, image data D2 are supplied.

FIG. 4 shows a block diagram of the memory unit 30 controlled by the CPU 6. Image data D2 is received through a switch 301 by a bi-level processor 302 which generates a bi-level data according to parameters supplied by the CPU 6, and the bi-level data is stored in a multi-port image memory 304 having a capacity to store image data of one page of A3 size paper at 400 dots per inch (dpi). For an image data of a document of $X_0 * Y_0$ pixel data, write to the image memory 304 is started from address (0, 0). Then, data of a first line is written along X direction, data of a next line is written along X direction, and so on. The bi-level processor 302 performs not only a simple bi-level processing but also a pseudo-halftone bi-level processing. After the image data are written to the image memory 304, a compressor 311 in a code processor 305 reads the image data and converts them to code data to be stored in a multi-port code memory 306.

A decoder 312 in the code processor 305 reads the code data in the code memory 306 when it receives an instruction from the CPU 6, and decodes the code data to generate image data to be written to the image memory 304. (The decoder 312 operates independently of the compressor 305. Data can be transmitted with direct memory access between the code memory 306 and the compressor 311 or the decoder 312.) When a page of image data is written to the image memory 304 be decoding, a multi-level processor 308 generates a multi-level data D3 from the bi-level data supplied by the rotation processor 307 according to parameters set by the CPU 6. Then, image data D3 is sent through the switch 301.

(2) Stapler, document direction and document scan modes

Figure 5:
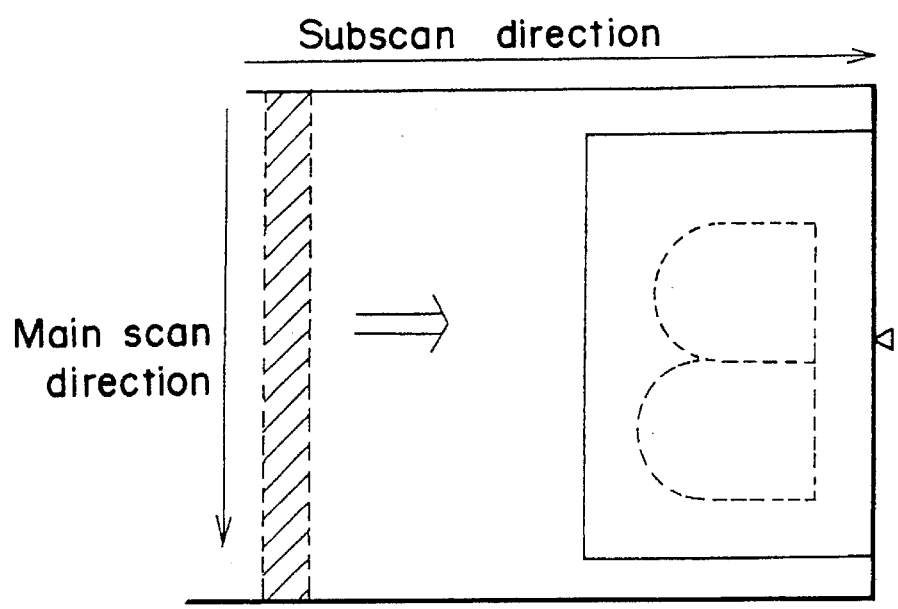
FIG. 5 is a plan view of a document placed on an automatic document feeder.
Figure 6:
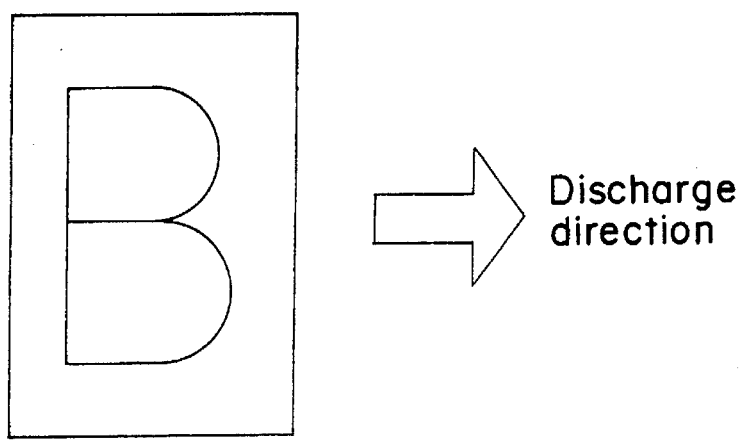
FIG. 6 is a plan view of papers discharged from a printer.

When a document is copied, as shown in FIG. 5, a document is placed on the platen 18 with its face down and the scanner 19 move along a subscan direction over the face to read an image in the face. FIG. 6 shows a sheet of paper on which the image read by the image reader is reproduced and which is discharged along a direction shown as an arrow.

Next, reverse and normal scans for normal copy operation is explained. In the normal scan, the scanners in the scan system 10 are driven along a direction reverse to the subscan direction by rotating the motor M2 reversely. On the other hand, an image data along a main scan direction is stored in a line memory, and the image data is read in a reverse direction with respect to the direction when the data is stored. Therefore, the image data obtained in the normal scan is transposed completely with reference to those obtained in the reverse scan, so that an output image on the document reproduced on a sheet of paper is rotated by 180° with reference to that obtained by reverse scan. Thus, reversal of output image can be carried out without using a page memory and a rotation processing on the image data in the page memory. Thus, the memory capacity can be reduced largely. In 2-in-1 mode and the like, no rotation processing is needed on a synthesized document image.

Figure 7A:
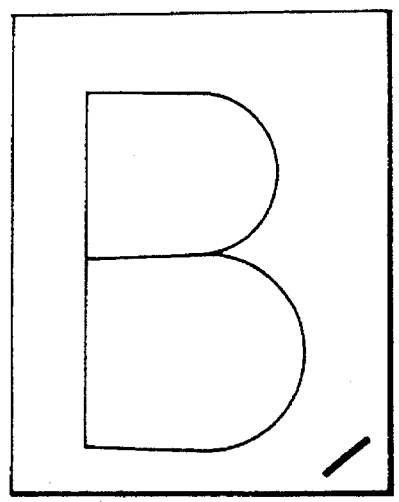
FIGS. 7A and 7B are plan views of discharged copy papers which form normal images and reverse images.
Figure 7B:
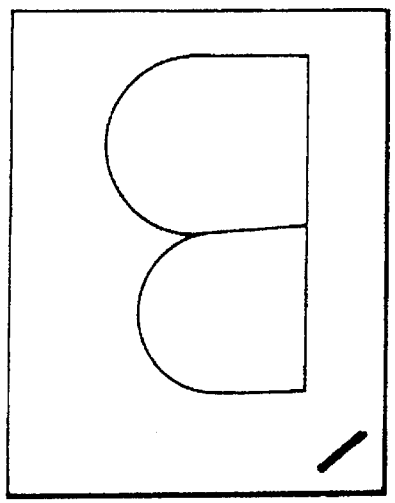

Next, a relation of the normal scan and the reverse scan is explained with respect to the stapler 60. The digital copying machine has the stapler 60 for binding copy papers with staplers. A user can select staple mode for stapling copy papers with the key 98 (FIG. 2). The stapler 60 shown in FIG. 1 binds the papers at a leftmost position near the bottom end as shown in FIG. 7A. This position is not appropriate for binding. Therefore, when a user selects the staple mode, the image data read by the image reader 220 has to be rotated by 180° before printing, in order to bind the papers suitably, as shown in FIG. 7B.

FIG. 8A–8D show schematically four kinds of situations of document images of portrait and landscape two-face documents when two-face documents are reproduced. A portrait document has a front face including an image of a character "A" and a back face including an image of a character "B", while another has a front face including an image of a character "C" and a back face including an image of a character "D". A landscape document has a front face including an image of characters "No. 1" and a back face including an image of characters "No. 2", while another has a front face including an image of characters "No. 3" and a back face including an image of characters "No. 4". In the present embodiment, if no margin is specified by a user, it is assumed that a portrait document has a left margin and that a landscape document has a top-margin.

Figure 8A:
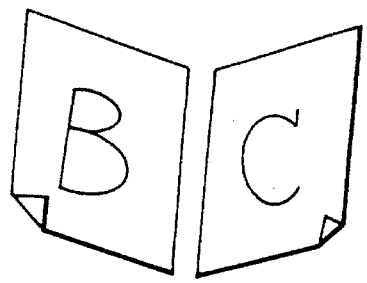
FIG. 8A is a diagram of a portrait document bound at the left side in a turned-over state.
Figure 8B:
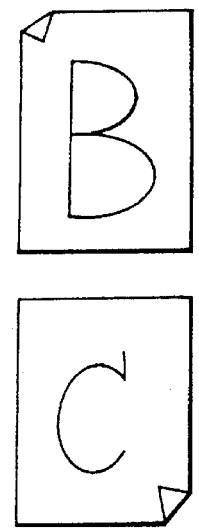
FIG. 8B is a diagram of a portrait document bound at the top side in a turned-over state.
Figure 8C:
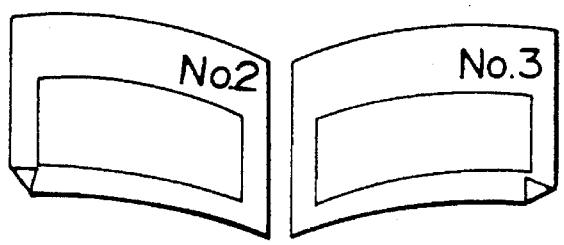
FIG. 8C is a diagram of a landscape document bound at the left side in a turned-over state.

For example, let us assume that portrait two-face documents bound at the left side thereof (or having a left margin) as shown in FIG. 8A are fed onto the platen by the automatic document feeder 500 along a direction perpendicular to document feed direction. Then, as shown in FIG. 9A, the front face including a character "A" and the back face including a character "B" are placed along the same document direction. Similarly, let us assume that landscape two-face documents bound at the left side thereof (or having a left margin) as shown in FIG. 8C are fed onto the platen by the automatic document feeder 500 along document feed direction. Then, as shown in FIG. 9C, the front face including a character "No. 1" is placed along the same direction as the back face including; a character "No. 2". The front face of a two-face document is also placed along the same direction as the back face when portrait two-face documents bound at the top side thereof are fed onto the platen by the automatic document feeder along document feed direction, as shown in FIG. 9E, and when landscape two-face documents bound at the left side thereof are fed onto the platen by the automatic document feeder along a direction perpendicular to document feed direction, as shown in FIG. 9G.

Figure 8D:
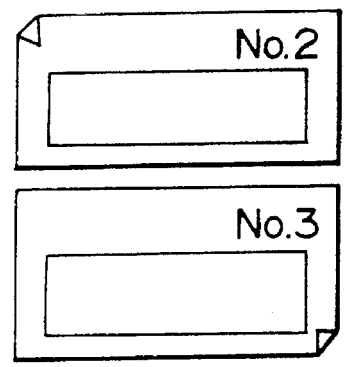
FIG. 8D is a diagram of a landscape document bound at the top side in a turned-over state.

On the contrary, the back face of a two-face document is also placed reversely to the front face in the situation described below when the two-face document is fed by the automatic document feeder 500. For example, let us assume that portrait tow-face documents bound at the top side thereof as shown in FIG. 8B are fed onto the platen by the automatic document feeder 500 along document feed direction. Then, as shown in FIG. 9B, the back face including a character "B" is placed reversely by 180° with reference to the front face including a character "A". Similarly, let us assume that landscape two-face documents bound at the top side thereof as shown in FIG. 8D are fed onto the platen by the automatic document feeder 500 along a direction perpendicularly to document feed direction. Then, as shown in FIG. 9D, the back face including a character "No. 2" is placed reversely by 180° with reference to the front face including a character "No. 2". The back face of a two-face document is also placed reversely to the front face when portrait two-face documents bound at the top side thereof are fed onto the platen by the automatic document feeder 500 along a direction perpendicular to document feed direction, as shown in FIG. 9F, and when landscape two-face documents bound at the left side thereof are fed onto the platen by the automatic document feeder 500 along document feed direction, as shown in FIG. 9H.

In order to regulate the direction of documents in these situations, the scan direction is reversed in these situations shown in FIGS. 9B, 9D, 9F and 9H in order to read an image reversed by 180°. Then, the direction of document image stored in the image memory has always the same direction, and it can be stapled suitably by the stapler 60.

This eight types of setting conditions of two-face documents on the platen 18 are determined by the kind of document (portrait and landscape), the margin position and the longitudinal direction of documents with respect to the document feed direction. The kind of document, that is, portrait document or landscape document, is specified with the key 103 by a user. The margin position is determined by a user at left or top with the key 99. If no margin is specified by a user, it is assumed in the present embodiment that a portrait document has a left margin and a landscape document has a top margin. The direction of documents with respect the document feed direction in the automatic document feeder 500 is detected with the sensors SE51 when the documents are fed onto the platen.

Therefore, a reverse image can be formed in two-face copy in real time. Further, a reverse image can be formed in two-face copy without using rotation processing of image data or without providing an image memory for storing all image data for rotation processing. Because reverse image can be formed automatically, a user does not care for document direction when documents are set in an automatic document feeder.

Figure 10:
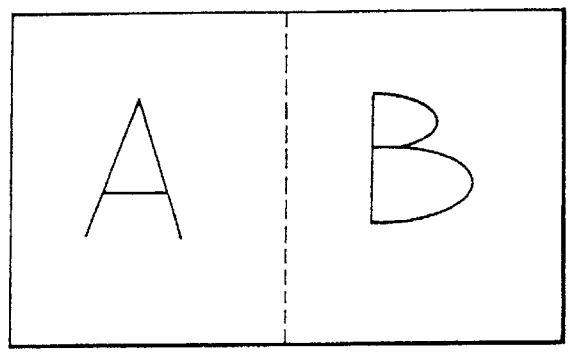
FIG. 10 is a plan view of front and back faces of four documents printed in a 2-in-1 mode.
Figure 11A:
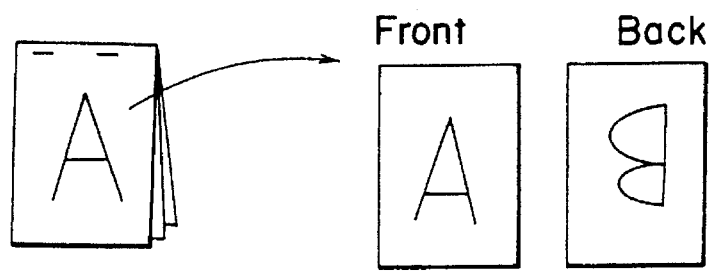
FIG. 11A is a perspective view of two-face documents bound at the top thereof.
Figure 11B:
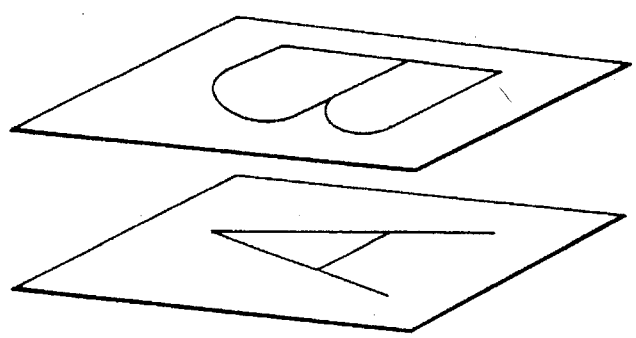
FIG. 11B is a plan view of front and back faces of such a document shown in FIG. 11A fed on the platen.

A user can specify 2-in-1 copy mode with the N-in-1 key 102. In the 2-in-1 mode, two document images are synthesized on a single face of a copy paper as shown in FIG. 10. Therefore, it is required that the document images to be synthesized have same image directions irrespective of single-face documents and two-face documents. However, for example, as shown in FIG. 11A, portrait documents bound at the top side have different image direction. As explained above, the direction of document image stored in the image memory has always the same. Therefore, a normal image can always be printed in the 2-in-1 copy mode.

(3) Detail explanation of the operations in the digital copying machine

Figure 12:
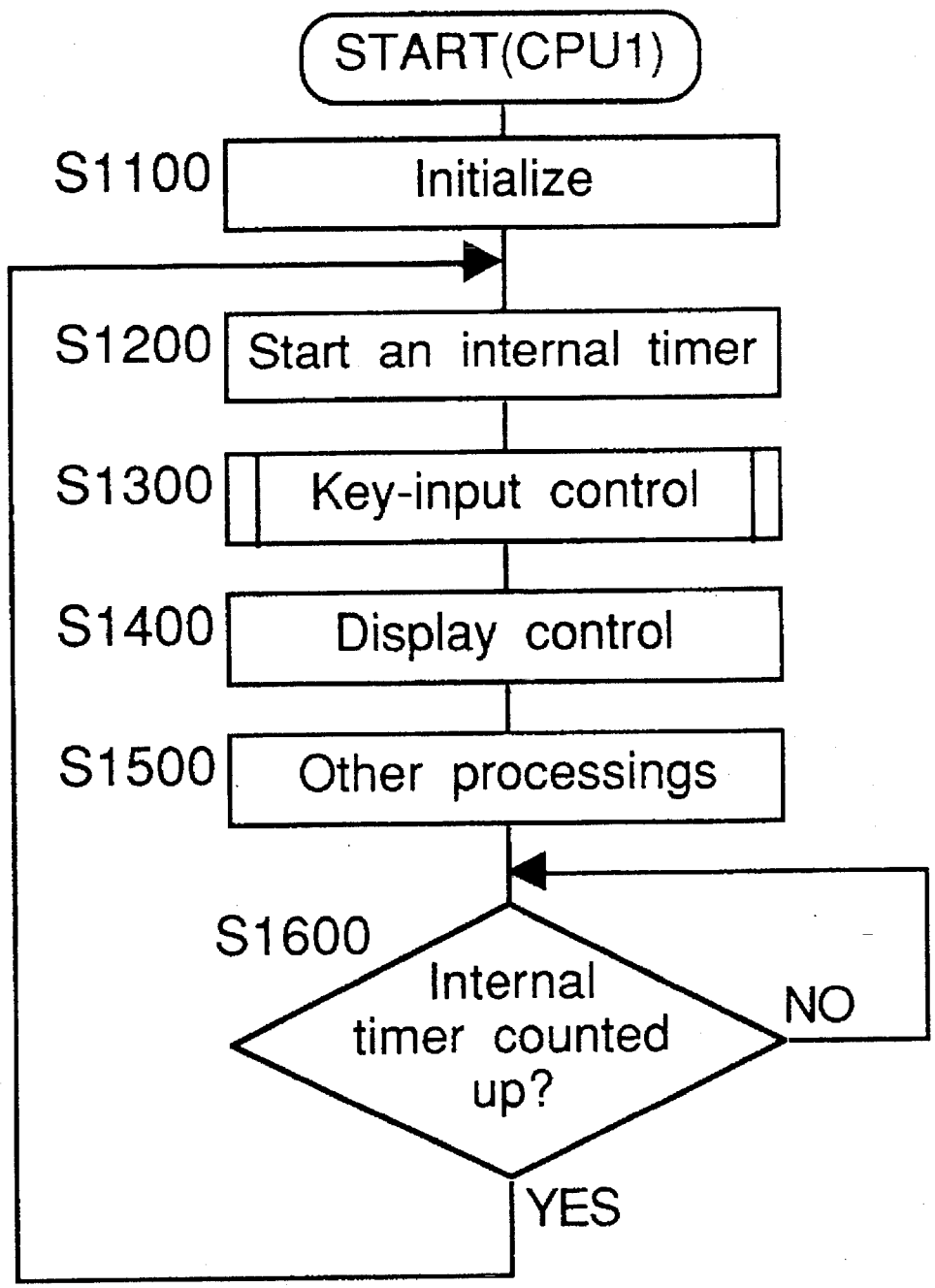
FIG. 12 is a main flowchart of CPU 1 which controls an operational panel.

The operation of the digital copying machine is explained below in detail with reference to flowcharts. FIG. 12 shows a main flowchart of the CPU 1 which controls key-inputs and displays for the operational panel 90. First, the CPU 1 is initialized (step S1100). Then, an internal timer is started for monitoring to keep a time needed for one routine of this flow constant (step S1200), and key-input control (step S1300) and display control (step S1400) are performed successively. Then, other processings not explained here are performed (step S1500). Then, after it is waited that the timer is counted up (YES at step S1600), the flow returns to step S1200. The CPU 1 communicates with other CPUs 2–8 by interrupt processing.

Figure 13A:
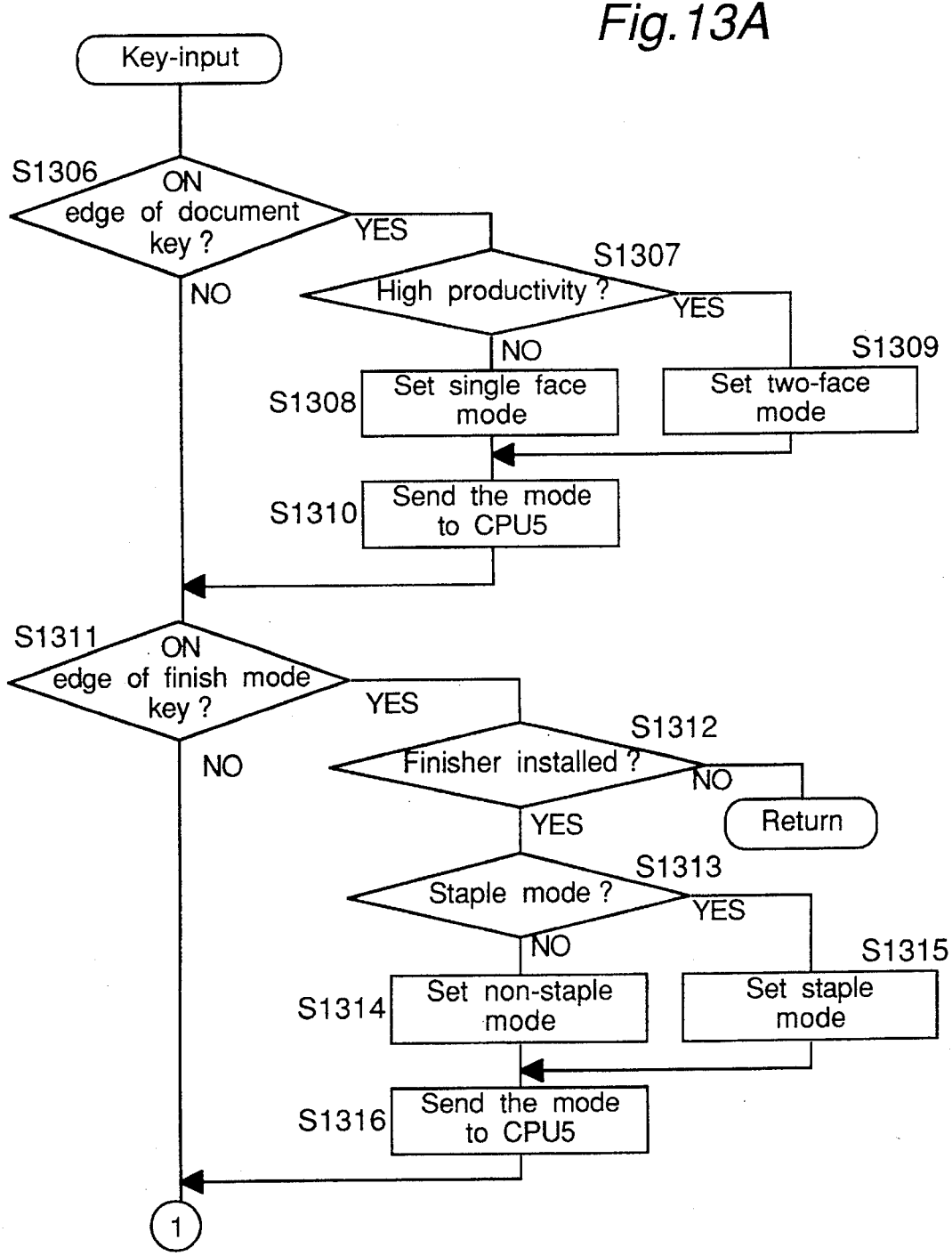
Figure 13C:
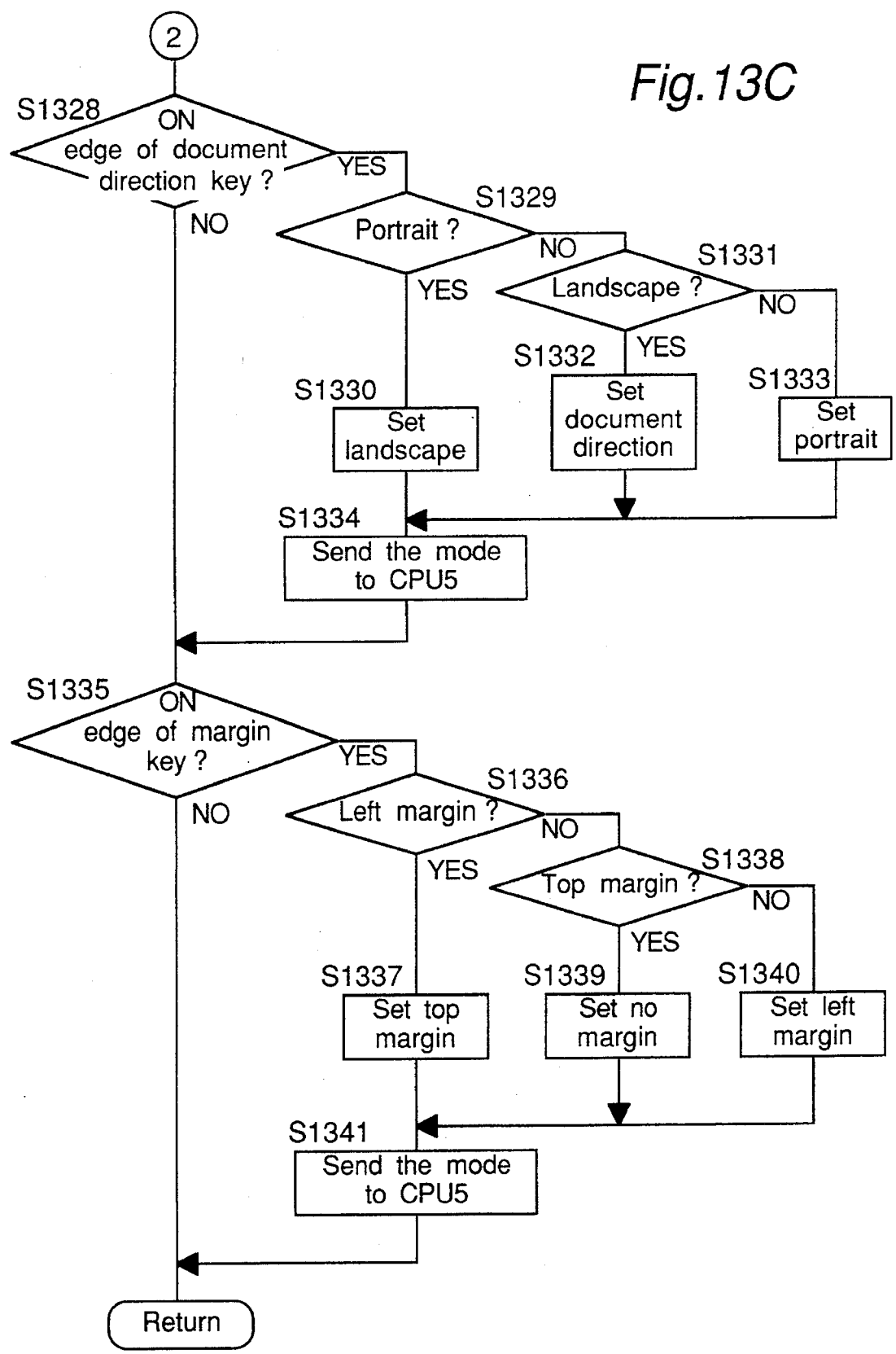

FIGS. 13A, 13B and 13C show a flow of the key-input control (step S1300 in FIG. 12). In this flow, key-input signals from the operational panel 90 are analyzed and sent to the CPU 5. First, when a key-input signal of the document type key 100 is received (YES at step S1306), document type (single-face document or two-face document) is selected cyclicly. If single-face document mode has been set or the LED 100*b* is turned on (YES at step S1307), two-face document mode is set (step S1309), or the LED 100*b* is turned off and the LED 100*a* is turned on. On the other hand, if single-face document mode has not been set or the LED 100*a* is turned on (NO at step S1307), single-face document mode is set (step S1308), or the LED 100*a* is turned off and the LED 100*b* is turned on. Then, the mode change is transmitted to the CPU 5 (step S1310).

When a key-input of the finish mode key 98 is received (YES at step S1311), finish mode is selected cyclically. First, it is checked if the finisher unit 600 is attached to the copying machine or not (step S1312). If the finisher unit 600 is decided not to be attached to the copying machine or if the LEDs 98*a* and 98*b* have been turned off (NO at step S1312), the flow returns readily. If the finisher unit 600 is decided to be attached to the copying machine (YES at step S1312), it is decided next if non-staple mode has been set or not (step S1313) or if the LED 98*a* is turned on. If non-staple mode has not been set or the LED 98*a* is not turned on (NO at step S1313), staple mode is set (step S1315), or the LED 98*a* is turned off and the LED 98*b* is turned on. On the other hand, if non-staple mode has not been set (NO at step S1313), non-staple mode is set (step S1314), or the LED 98b is turned off and the LED 98a is turned on. Then, the output mode change is transmitted to the CPU 5 (step S1316).

When a key-input of the copy key 101 is received (YES at step S1317), copy mode (single-face copy mode or two-face copy mode) is changed cyclicly. If single-face copy mode has been set or the LED 101b is turned on (YES at step S1318), two-face copy mode is set (step S1320), or the LED 101b is turned off and the LED 101a is turned on. On the other hand, if single-face copy mode has not been set or the LED 101a is turned on (NO at step S1318), single-face copy mode is set (step S1319), or the LED 101a is turned off and the LED 101b is turned on. Then, the copy mode change is transmitted to the CPU 5 (step S1321).

When a key-input of the N-in-1 key 102 is received (YES at step S1321), 2-in-1 mode, 4-in-1 mode or 1-in-1 mode is selected cyclicly. If 1-in-1 mode has been set or the LED 102a is turned on (YES at step S1322), 2-in-1 mode is set (step S1323), or the LEDs 102a and 192c are turned off and the LED 102b is turned on. On the other hand, if 1-in-1 mode has not been set or the LED 102b is turned on (NO at step. S1322), it is decided next if 2-in-1 mode has been set (step S1324). If 2-in-1 mode is decided to be set (YES at step S1324), 4-in-1 mode is set (step S1325), or the LEDs 102a and 102b are turned off and the LED 102c is turned on. If 2-in-1 mode is decided not to be set (NO at step S1324), 1-in-1 mode is set (step S1326), or the LEDs 102b and 102c are turned off and the LED 102a is turned on. Then, the copy mode change is transmitted to the CPU 5 (step S1327).

When a key-input of the document direction key 103 is received (YES at step S1328), document direction (portrait or landscape) is selected cyclically. First, it is checked if the document direction has been set as portrait (step S1329). If a document direction has been set as portrait or the LED 103a is turned on (YES at step S1329), landscape direction is set (step S1330), or the LED 103b is turned on. On the other hand, if landscape direction has been set or the LED 103b is turned on (YES at step S1331), no document direction is selected (step S1332) or the LEDs 103a and 103b are turned off. If landscape direction has been set or the LED 103b is turned on (NO at step S1331), portrait direction is set (step S1333), or the LED 103b is turned off and the LED 103a is turned on Then, the direction change is transmitted to the CPU 5 (step S1334).

When a key-input of the margin key 97 is received (YES at step S1335), margin position is selected cyclically. First, it is checked if margin position is set at left (step S1336). If margin position has been set as left or the LED 99a is turned on (YES at step S1336), top position is set (step S1337), or the LED 99a is turned off and the LED 99b is turned on. On the other hand, if top position has been set or the LED 99b is turned on (YES at step S1338), no margin position is selected (step S1339) or the LEDs 99a and 99b are turned off. If top position has been set or the LED 103b is turned on (NO at step S1338), left position is set (step S1340), or the LED 99a is turned on and the LED 99b is turned on. Then, the direction change is transmitted to the CPU 5 (step S1341), and the flow returns to the main flow.

Figure 14:
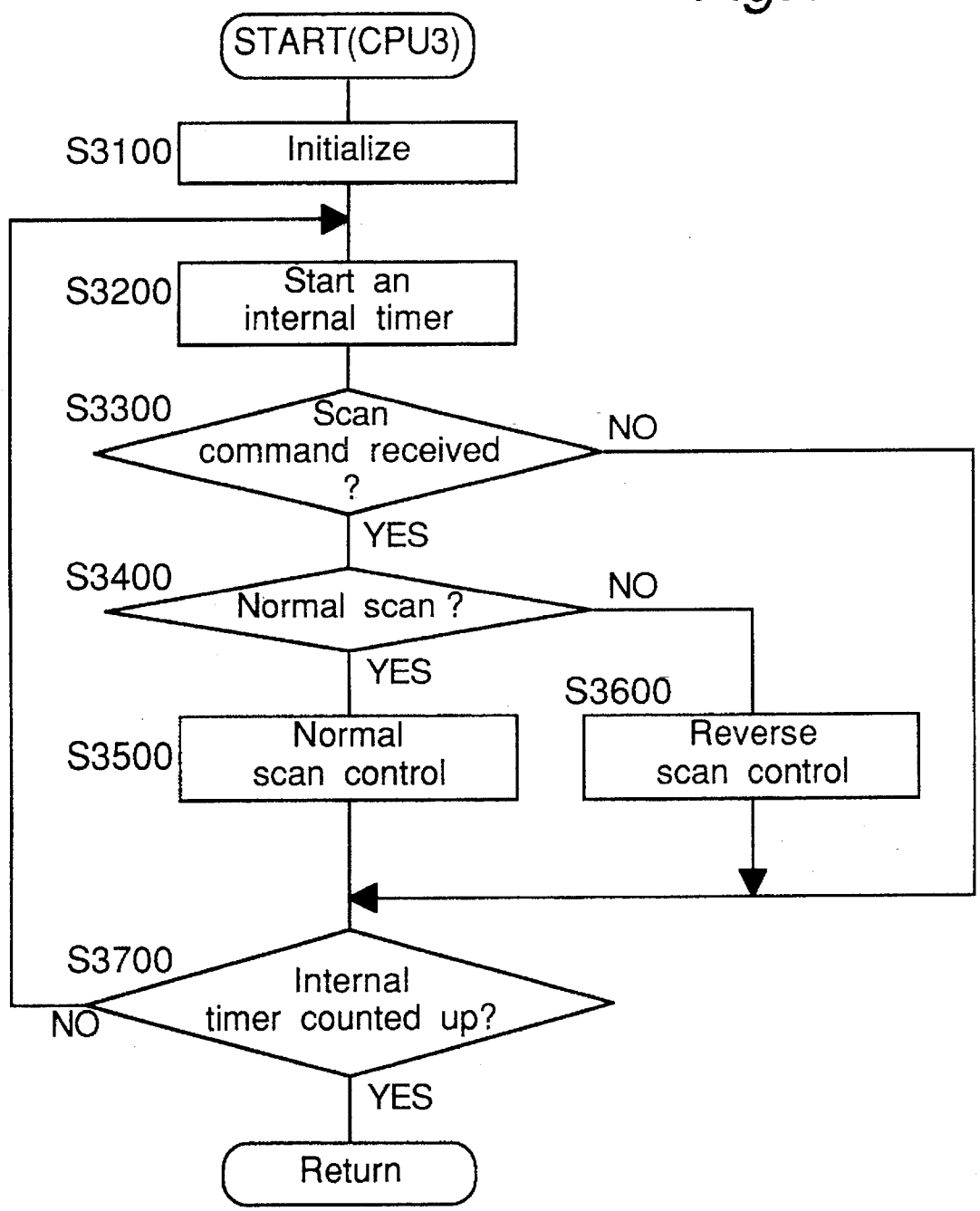
FIG. 14 is a main flowchart of CPU 3 for controlling a scan system.

FIG. 14 shows a main flow of the CPU 3 which controls the scan system 10 in the digital copying machine. First, the CPU 3 is initialized (step S3100). Then, an internal timer is started for monitoring a time needed for one routine of this flow to keep it constant (step S3200). If a scan command is decided to be received from the CPU 5 (YES at step S3300), the scan direction is checked (step S3400). If the scan direction is decided to be normal scan direction (YES at step S3400), normal scan control is performed (step S3500), otherwise reverse scan control for normal copy operation is performed (step S3600). Then, it is waited that the timer is counted up (YES at step 3700), and the flow returns to step S3200. The reverse scan for normal copy operation is explained above in the normal scan, the scanners are driven along a direction reverse to the subscan direction and the image data is read in a reverse direction with respect to the direction when the data is stored. In the reverse scan, the scanners are driven along the subscan direction and the image data is read in a direction along which the data is stored.

Figure 15:
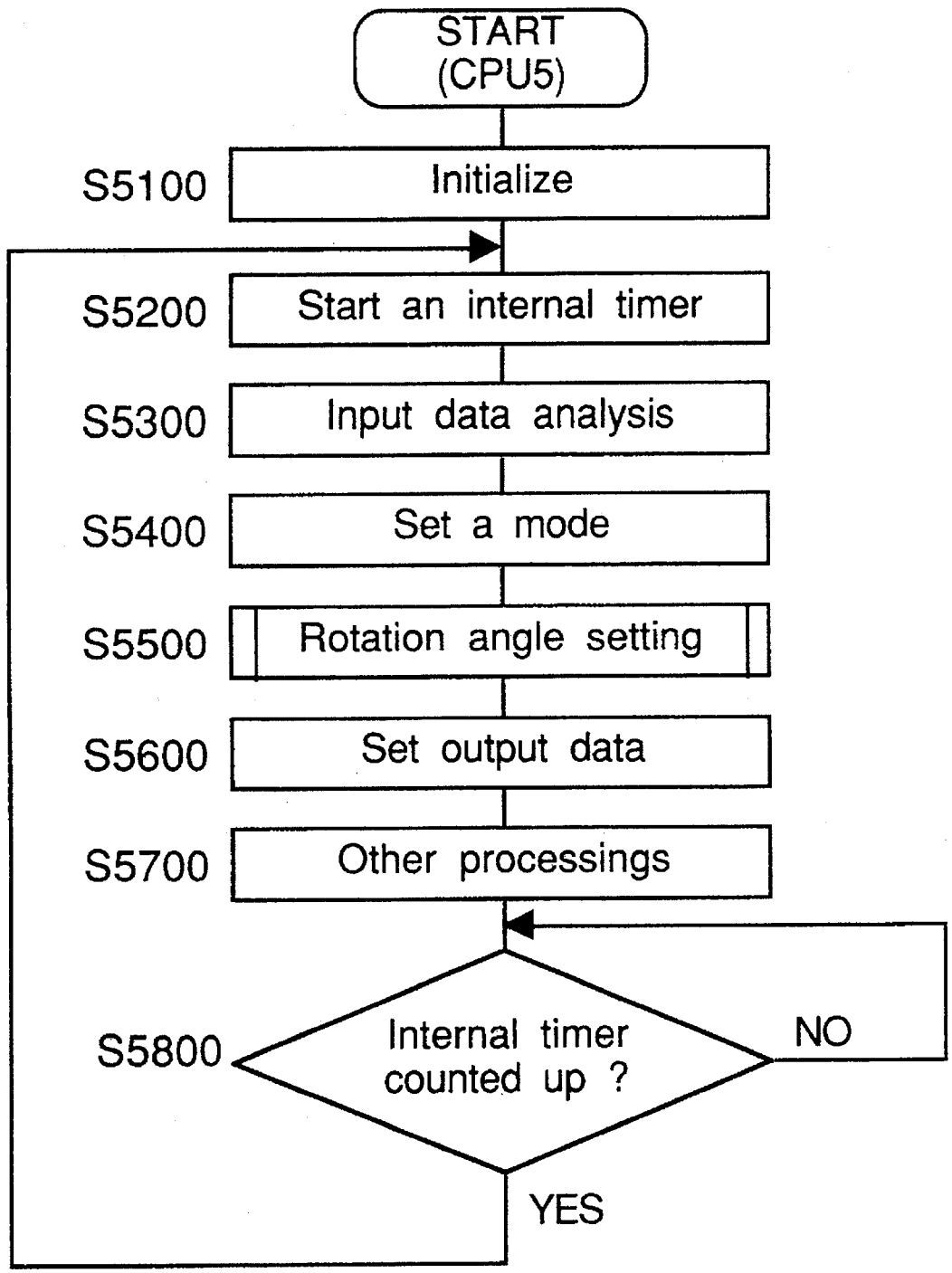
FIG. 15 is a flowchart of a main routine of CPU 5 for controlling timings between various processings.

FIG. 15 shows a flow of a main routine of CPU 5 which sends commands and sets operation modes for other CPUs for controlling the timing of various sections in the copying machine. First, the CPU 5 is initialized (step S5100). Then, an internal timer is started for monitoring to keep a time needed for one routine of this flow constant (step S5200). Then, input data is analyzed (step S5300) wherein input data transmitted according to an interrupt is checked and analyzed. If a mode is changed in the input data analysis, the operation mode is set (step S5400). Then, commands are set according to the operation mode (step S5500), and the data are provided at an output area for data transmission (step S5600). Then, other processings not explained above are performed (step S5700). Then, it is waited that the timer is counted up (YES at step 5800), and the flow returns to step S5200.

Figure 16A:
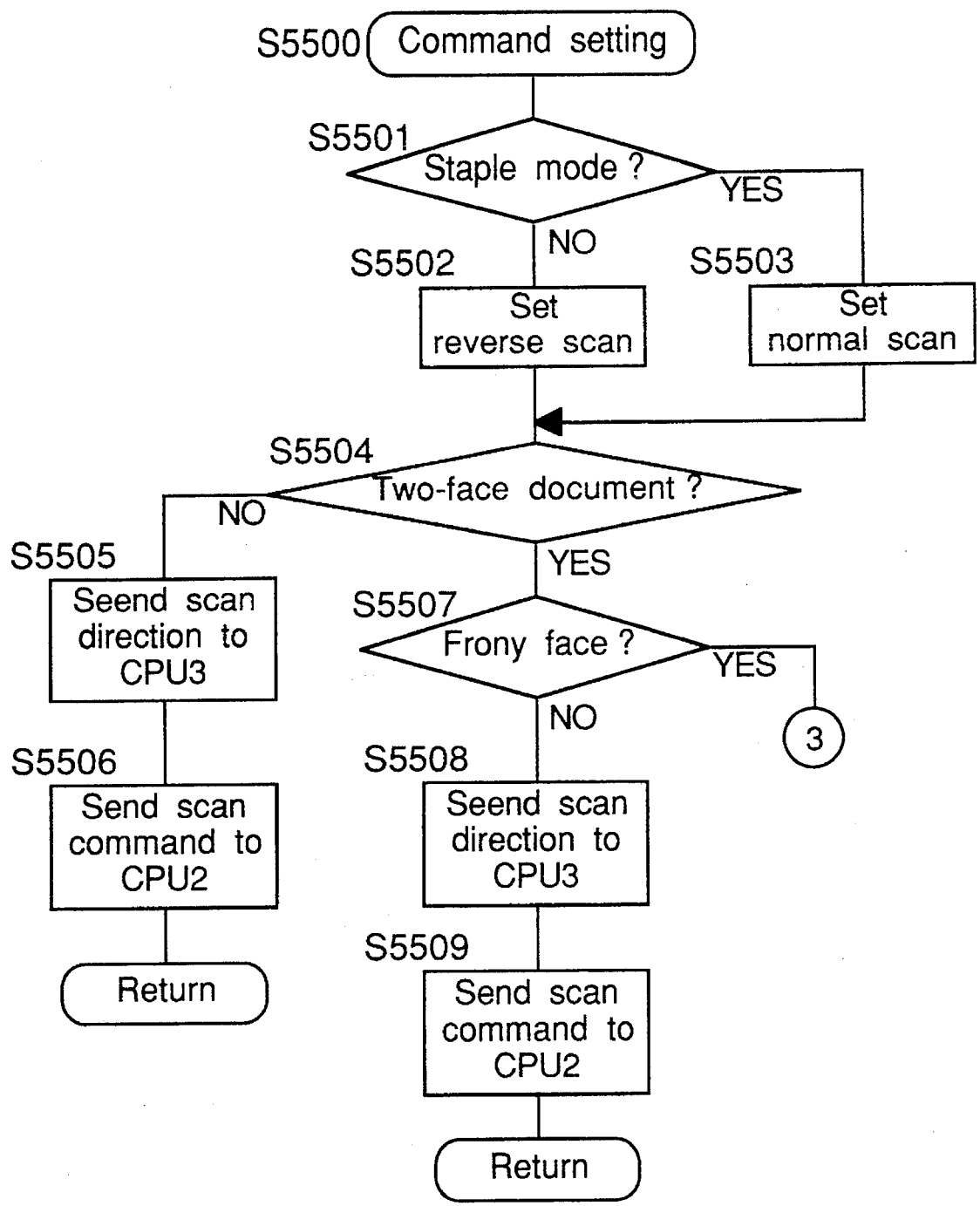

FIGS. 16A and 16B show a flow for setting commands according to the operation mode (step S5500 in FIG. 15). If staple mode is decided to be set (YES at step S5501), normal scan is set for rotating the output image by 180° (step S5503), otherwise reverse scan is set (step S5502).

Next, it is decided if a two-face document is set or not (step S5504). If a two-face document is decided not to be set (NO at step S5506), the scan direction is sent to the CPU 3 (step S5505), the scan command is sent to the CPU 3 (step S5506), and the flow returns to the main flow.

If a two-face document is decided to be set (YES at step S5506), it is checked next if a first face (front face) of a two-face document is read or not (step S5507). If the first face is decided not to be read (NO at step D5507), the scan direction is sent to the CPU 3 (step S5508), the scan command is sent to the CPU 3 (step S5509), and the flow returns to the main flow.

If a first face (front face) is decided to be read (YES at step S5507), it is checked next if the document direction is portrait or not (step S5510). If the document is decided to be a portrait document (YES at step S5510), it is checked next if a margin is set or not (step S5511), and if the margin is set (YES at step S5511), it is checked next if the margin is set at left (step S5513). If the margin is not set (NO at step S5511) or if the margin is set at left (YES at step S5513), it is decided next if the document is fed laterally or along a direction perpendicular to the longitudinal direction of the document (step S5512). If the document is decided to be fed laterally (YES at step S5512), the direction of the back face of the document fed on the plated is the same as that of the front face, and the flow proceeds readily to step S5521. On the other hand, if the document is decided not to be fed laterally (NO at step S5512) or if the document is fed longitudinally, the direction of the back face of the document fed on the plated is different from that of the front face. Then, the scan direction is changed between the normal scan and the reverse scan (step S5515), and the flow proceeds to step S5521. Further, if the margin is decided not to be set at left (NO at step S5513) or if the margin is set at top, it is decided next if the document is fed laterally or along a lateral direction perpendicular to the longitudinal direction of the document (step S5514). If the document is decided to be fed laterally (YES at step S5514), the scan direction is changed from the normal scan to the reverse scan and vice versa (step S5515), and the flow proceeds to step S5521. On the other hand, if the document is decided not to be fed laterally (NO at step S5512) or if the document is fed longitudinally, the flow proceeds to step S5521.

If the document is decided not to be a portrait document (NO at step S5510) or if the document is a landscape document, it is checked next if a margin is set or not (step S5516), and if the margin is set (YES at step S5516), it is checked next if the margin is set at left (step S5517). If the margin is not set (NO at step S5516) or if the margin is not set at left (NO at step S5517) or if the margin is set at top, it is decided next if the document is fed laterally or along a direction perpendicular to the longitudinal direction of the document (step S5519). If the document is decided to be fed laterally (YES at step S5519), the direction of the back face of the document fed on the platen is the same as that of the front face, and the flow proceeds to step S5521. On the other hand, if the document is decided not to be fed laterally (NO at step S5519) or if the document is fed longitudinally, the direction of the back face of the document fed on the platen is different from that of the front face. Then, the scan direction is changed from the normal scan to the reverse scan and vice versa (step S5520), and the flow proceeds to step S5521. Further, if the margin is decided to be set at left (YES at step S5517), it is decided next if the document is fed laterally or along a direction perpendicular to the longitudinal direction of the document (step S5518). If the document is decided to be fed laterally (YES at step S5518), the scan direction is changed between the normal scan and the reverse scan (step S5520), and the flow proceeds to step S5521. On the other hand, if the document is decided not to be fed laterally (NO at step S5519) or if the document is fed longitudinally, the flow proceeds to step S5521.

Then, the scan direction is sent to the CPU 3 (step S5521), the scan command is sent to the CPU 3 (step S5522), and the flow returns to the main flow.

Figure 17:
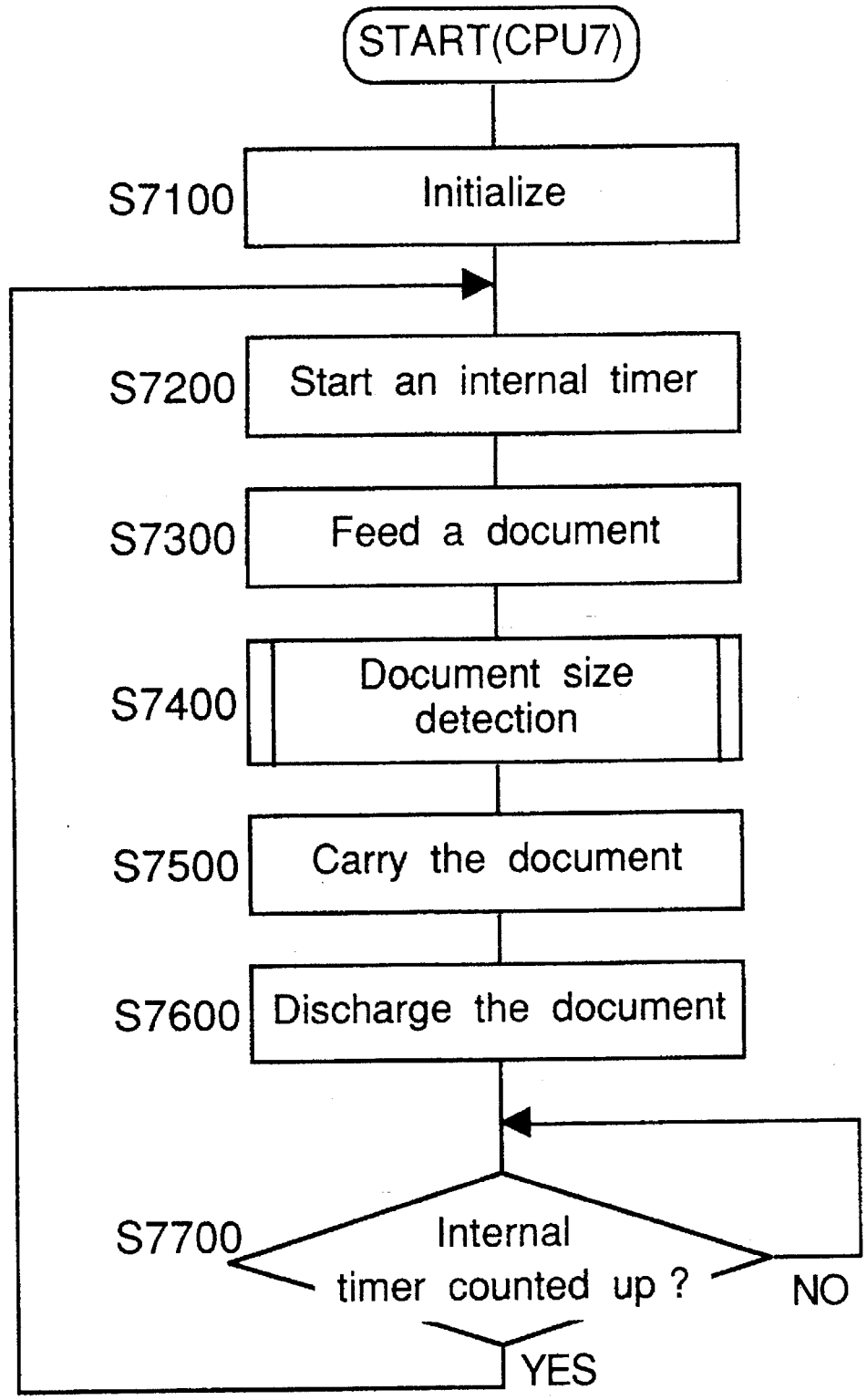
FIG. 17 is a main flowchart of the CPU 7 which controls an automatic document feeder.

FIG. 17 shows a main flow of the CPU 7 which controls the automatic document feeder 500. After initialization (step S7100), an internal timer is started for monitoring to keep a time for one routine of this flow constant (step S7200). Then, a document is fed to the belt 506 (step S7300), and a document size is detected (step S7400). Then, the document is carried by the belt 506 to a predetermined position on the platen 18 (step S7500). After the document is read, the document is carried by the reverse roller 507 to be discharged or to be carried again onto the platen 18 according to copy mode (step S7600). Then, if the internal timer is counted up (YES at step S7700), the flow returns to step S7200.

Figure 18A:
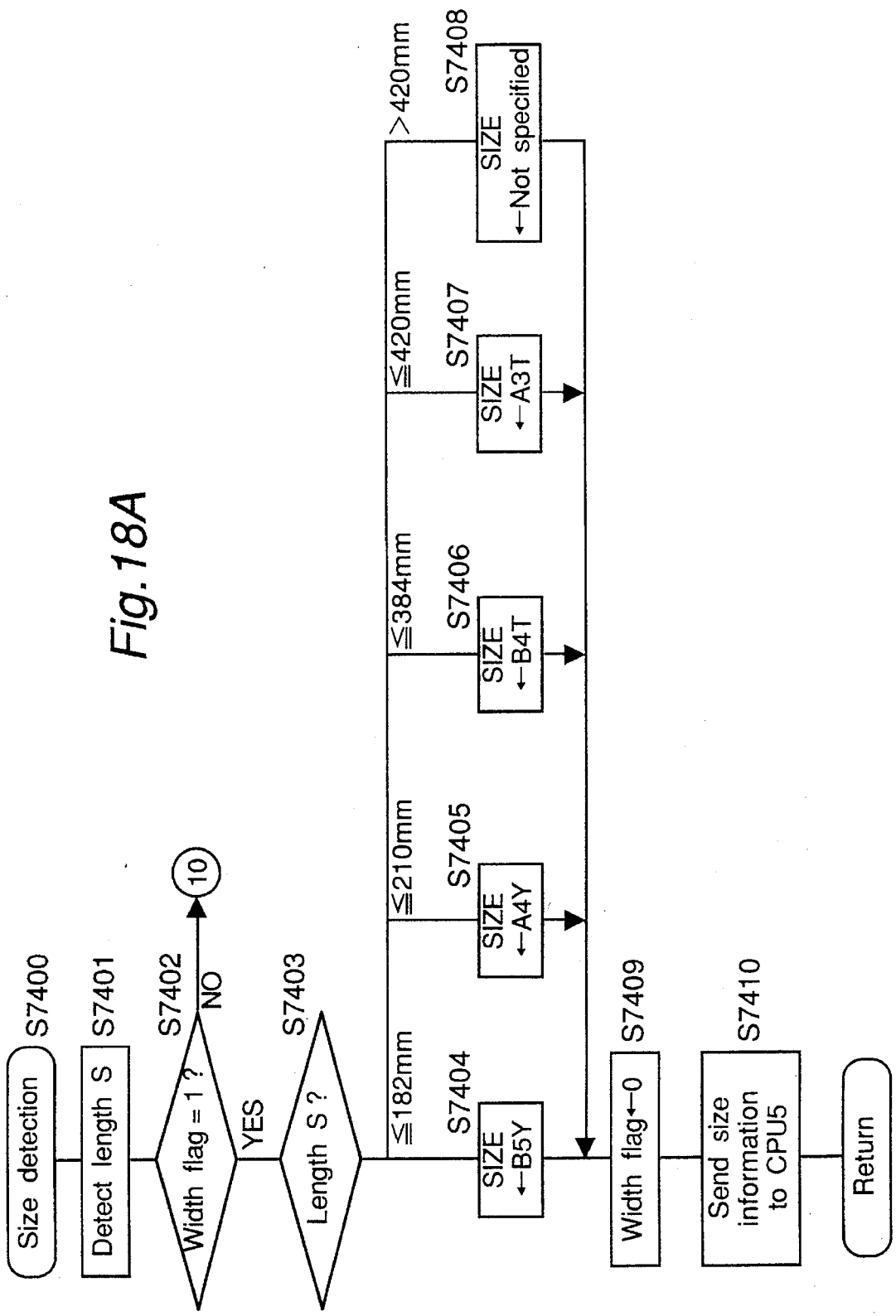
FIGS. 18A and 18 are a flowchart of size detection.
Figure 18B:
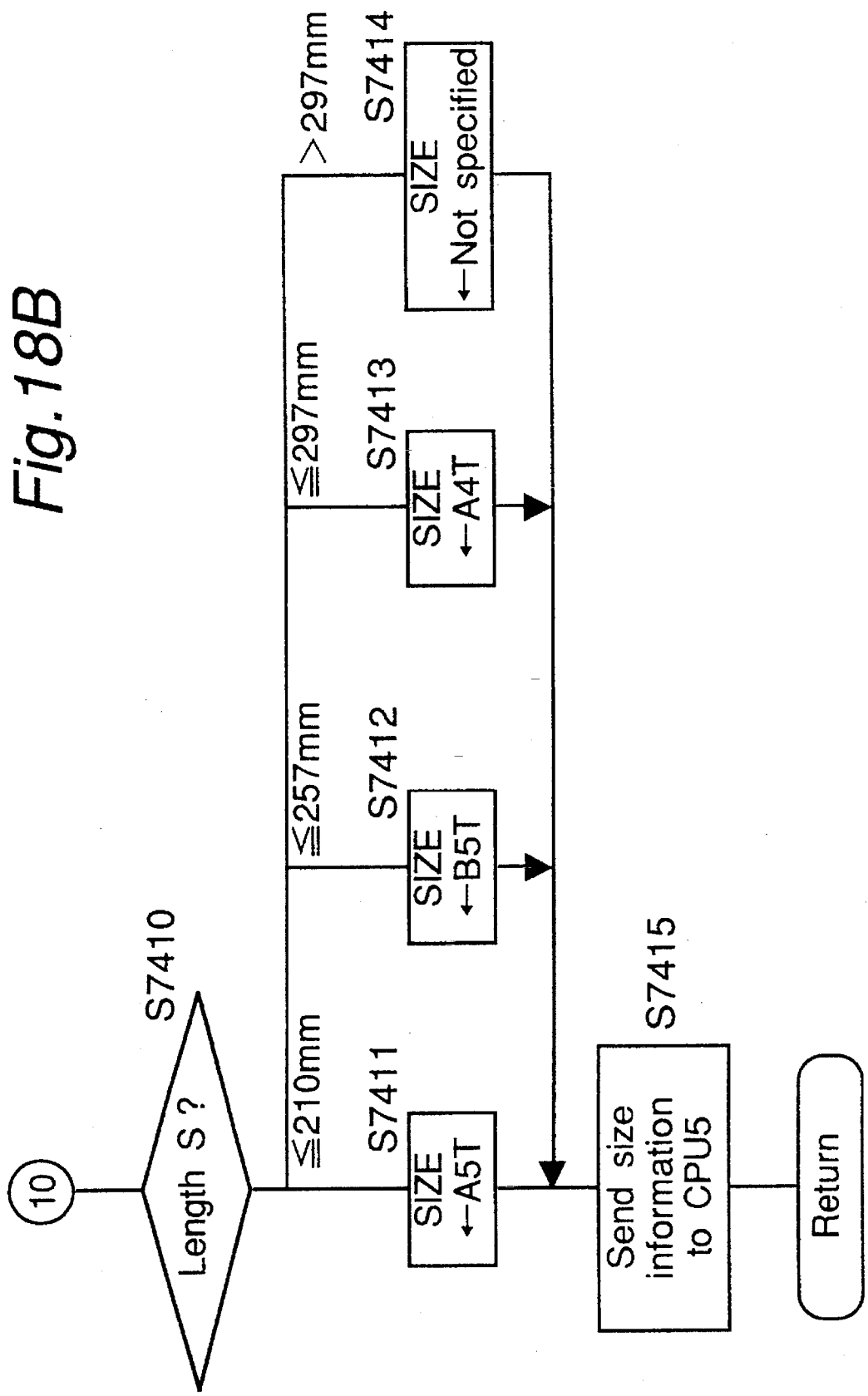

FIGS. 18A and 18B show a flow of size detection (step S7400 in FIG. 17). First, a document length S is measured with the sensors SE51 according to a time needed to feed a document over them (step S7401). The time is proportional to the document length S. Next, it is decided if the width flag is set to be "1" (step S7402). The sensors SE51 detect a document having a width larger than that of a B4 document carried laterally, and this sets the width flag as "1". The document size is determined by the length S and the width flag. In FIGS. 18A and 18B, "T" means a paper fed along its longitudinal direction, while "Y" means a paper fed perpendicularly to its longitudinal direction. If the width flag is decided to be set to be "1" (YES at step S7402), the flow branches according to length S (step S7403). That is, if the length S is 182 mm or less, the document size is determined as B5Y or B5 size fed perpendicularly to its longitudinal direction (step S7404). If the length S is above 182 mm and 210 mm or less, the document size is determined as A4Y or A4 size fed perpendicularly to its longitudinal direction (step S7405). If the length S is above 210 mm and 384 mm or less, the document size is determined as B4T or B4 size fed along its longitudinal direction (step S7406). If the length S exceeds above 384 mm and 420 mm or less, the document size is determined as A3Y or A3 size fed perpendicularly to its longitudinal direction (step S7407). If the length S is above 420 mm, the document size is determined not to be set (step S7408). Then, the width flag is set as "0" (step S7409), and the size data is sent to the CPU 5 (step S7401).

If the width flag is decided not to be set as "1" (NO at step S7402), the flow branches according to the document length S (step S7410). That is, if the length S is 210 mm or less, the document size is determined as A5T or A5 size fed along its longitudinal direction (step S7411). If the length S is above 210 mm and 257 mm or less, the document size is determined as B5T or B5 size fed along its longitudinal direction (step S7412). If the length S is above 257 mm and 297 mm or less, the document size is determined as A4T or A4 size fed along its longitudinal direction (step S7413). If the length S is above 297, the document size is determined not to be set (step S7414). Then, the size data is sent to the CPU 5 (step S7415).

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus comprising:

an image sensor for detecting an image of a line in a document along a first direction or along a second direction reverse to the first direction;

a scan system which can shift a line detected by said image sensor along a third direction perpendicular to the first direction when said image sensor detects the line of the document along the first direction or along a fourth direction reverse to the third direction;

an image forming means for forming an image on a sheet of paper according to the image detected by said image sensor;

a stapler for stapling a plurality of papers received from said image forming means, which stapler stacking the papers so as to have an appropriate staple position when images of documents are detected by said image sensor along the first direction;

a staple mode selection means for selecting staple mode using said stapler or non-staple mode not using said stapler; and a control means for making said image sensor read a document image along the first line and for making said scan system move along the third direction when said staple mode selection means selects the staple mode.

2. The image forming apparatus according to claim 1, wherein said image sensor being able to supply the digital data in an inverted order.

3. The image forming apparatus according to claim 1, further comprising a line memory for storing digital data of a line received from said image sensor, which line sensor being able to supply the digital data in an inverted order.

4. The image forming apparatus according to claim 1, wherein said control means making said image sensor read a document image along the second line and for making said scan system move along the fourth direction when said staple mode selection means selects the non-staple mode.

5. The image forming apparatus according to claim 1, further comprising a document feeder for feeding a document onto the platen.

6. An image forming apparatus comprising:
   an image sensor for detecting an image of a line in a document along a first direction or along a second direction reverse to the first direction;
   a scan system which can shift a line detected by said image sensor along a third direction perpendicular to the first direction when said image sensor detects the line of the document along the first direction or along a fourth direction reverse to the third direction;
   an image forming means for forming an image on a sheet of paper according to the image detected by, said image sensor;
   a stapler for stapling a plurality of papers received from said image forming means, which stapler stacking the papers so as to have an appropriate staple position when images of documents are detected by said image sensor along the first direction;
   a staple mode selection means for selecting staple mode using said stapler or non-staple mode not using said stapler;
   a document feeder for feeding a document onto the platen;
   a document status decision means for deciding if the staple position of said stapler is appropriate in a reproduced image of a document or not;
   a scan control means for making said image sensor read a document image along the first line and for making said scan system move along the third direction when the staple mode is set by said staple mode selection means; and
   a mode change means for reversing the detection direction by said image sensor and the shift direction by said scan system when said document status decision means decides that the staple position of said stapler is not appropriate for an image of a document to be reproduced.

7. The image forming apparatus according to claim 6, wherein said document status detection means comprising a document direction setting means for setting that the document is a portrait document or a landscape document, a margin setting means for setting a position of margin, and a document feeding state detection means for detecting a longitudinal direction of the document with respect to document feed direction of said document feeder, which document status detection means detecting the document state according to detection results of said document direction setting means, said margin setting means and said document feeding state detection means.

8. The image forming apparatus according to claim 6, wherein said margin setting sets a predetermined position of margin according to the document direction set by said document direction setting means if the position of margin is not specified by a user.

9. The image forming apparatus according to claim 6, wherein said document feeding state detection means comprises sensors for detecting the longitudinal direction of the document placed on the platen of said image reader.

10. The image forming apparatus according to claim 6, wherein said document feeder can invert a two-face document onto the platen after the front face of the document placed on the platen is detected by said image sensor, and said a mode change means reverses the detection direction by said image sensor and the shift direction by said scan system alternately for front and back faces of a two-face document.

* * * * *